United States Patent
Kovacic

(10) Patent No.: US 12,237,586 B2
(45) Date of Patent: *Feb. 25, 2025

(54) APPARATUS AND METHODS FOR DYNAMIC MANAGEMENT OF ANTENNA ARRAYS

(71) Applicant: Skyworks Solutions, Inc., Irvine, CA (US)

(72) Inventor: Stephen Joseph Kovacic, Newport Beach, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 17/669,193

(22) Filed: Feb. 10, 2022

(65) Prior Publication Data

US 2022/0271423 A1   Aug. 25, 2022

Related U.S. Application Data

(63) Continuation of application No. 16/986,045, filed on Aug. 5, 2020, now Pat. No. 11,283,170, which is a (Continued)

(51) Int. Cl.
*H01Q 3/28* (2006.01)
*H01Q 3/36* (2006.01)
(Continued)

(52) U.S. Cl.
CPC .............. *H01Q 3/28* (2013.01); *H01Q 3/36* (2013.01); *H01Q 9/0414* (2013.01);
(Continued)

(58) Field of Classification Search
CPC .......... H01Q 3/28; H01Q 3/36; H01Q 9/0414; H01Q 21/065; H04W 52/32;
(Continued)

(56) References Cited

U.S. PATENT DOCUMENTS 5,548,813 A    8/1996  Charas et al.
8,942,653 B2   1/2015  Ahn et al.
(Continued)

FOREIGN PATENT DOCUMENTS

CN   107069208     8/2017
CN   206774674 U  12/2017

OTHER PUBLICATIONS

Kim et al., "Tens of Gbps Support with mmWave Beamforming Systems for Next Generation Communications" IEEE, Globecom 2013—Wireless Communications Symposium, 6 pages.
(Continued)

*Primary Examiner* — Raymond S Dean
(74) *Attorney, Agent, or Firm* — Knobbe, Martens, Olson & Bear, LLP

(57) ABSTRACT

Apparatus and methods for dynamic management of antenna arrays are provided herein. In certain configurations, a radio frequency (RF) system includes an antenna array including a plurality of antenna elements. The RF system further includes a plurality of signal conditioning circuits operatively associated with the antenna elements, and an antenna array management circuit that generates a plurality of enable signals that individually control activation of the signal conditioning circuits to dynamically manage the antenna array. The array of antenna elements can be dynamically managed to control a trade-off between power consumption, off-beam capture, and communication range/rate.

20 Claims, 17 Drawing Sheets

Related U.S. Application Data continuation of application No. 16/862,471, filed on Apr. 29, 2020, now abandoned, which is a continuation of application No. 15/834,419, filed on Dec. 7, 2017, now abandoned.

(60) Provisional application No. 62/437,502, filed on Dec. 21, 2016, provisional application No. 62/433,493, filed on Dec. 13, 2016.

(51) Int. Cl.
    *H01Q 9/04*         (2006.01)
    *H04W 52/32*      (2009.01)
    *H04W 52/36*      (2009.01)
    *H01Q 21/06*      (2006.01)
    *H04B 7/0413*     (2017.01)
    *H04B 7/0426*     (2017.01)
    *H04B 7/06*        (2006.01)
    *H04W 16/28*      (2009.01)

(52) U.S. Cl.
    CPC ......... *H04W 52/32* (2013.01); *H04W 52/367* (2013.01); *H01Q 21/065* (2013.01); *H04B 7/0413* (2013.01); *H04B 7/043* (2013.01); *H04B 7/0602* (2013.01); *H04W 16/28* (2013.01)

(58) Field of Classification Search
    CPC .. H04W 52/367; H04W 16/28; H04B 7/0413; H04B 7/043; H04B 7/0602
    See application file for complete search history.

(56) References Cited

U.S. PATENT DOCUMENTS

| | | | |
|---|---|---|---|
| 9,294,056 | B2 | 3/2016 | Nobbe et al. |
| 11,283,170 | B2 | 3/2022 | Kovacic |
| 2003/0228857 | A1 | 12/2003 | Maeki |
| 2006/0292980 | A1 | 12/2006 | Marcos Alba |
| 2007/0263748 | A1 | 11/2007 | Mesecher |
| 2008/0268775 | A1 | 10/2008 | Bishop |
| 2008/0268790 | A1 | 10/2008 | Shi et al. |
| 2011/0057742 | A1* | 3/2011 | Frye ............... H05K 1/0239 333/175 |
| 2012/0139805 | A1* | 6/2012 | Yu ............... H01Q 21/08 343/770 |
| 2013/0147664 | A1* | 6/2013 | Lin ............... H01Q 13/085 342/368 |
| 2013/0272437 | A1* | 10/2013 | Eidson ............... H04B 7/0413 375/267 |
| 2015/0084832 | A1* | 3/2015 | Ai ............... H01Q 1/246 343/893 |
| 2016/0204077 | A1* | 7/2016 | Ku ............... H01L 24/81 438/126 |
| 2017/0302348 | A1 | 10/2017 | Reinhardt |
| 2017/0331670 | A1 | 11/2017 | Parkvall et al. |
| 2018/0198204 | A1 | 7/2018 | Kovacic |
| 2021/0013604 | A1 | 1/2021 | Kovacic |
| 2021/0091462 | A1 | 3/2021 | Kovacic |

OTHER PUBLICATIONS

Karjalainen, Juha, "On Multi-Antenna Transceivers for mm-wave 5G," Samsung Electronics, 5G New Air Interfaces, IEEE Globecom Industry Workshop 2014, Austin, USA, 10 pages.

Peng et al. "High performance 5G millimeter-wave antenna array for 37-40 GHz mobile application" Conference Paper Mar. 2018, Research Gate IEEE in 5 pages.

Rajagopal et al., "Power Efficient Signal Processing for mmWave 5G Systems" J Sign Process Syst 2016, Published online: Nov. 18, 2015, 14 pages.

* cited by examiner

APPARATUS AND METHODS FOR DYNAMIC MANAGEMENT OF ANTENNA ARRAYS

CROSS-REFERENCE TO RELATED APPLICATIONS

This application is a continuation of U.S. patent application Ser. No. 16/986,045, filed Aug. 5, 2020 and titled "APPARATUS AND METHODS FOR DYNAMIC MANAGEMENT OF ANTENNA ARRAYS" which is a continuation of U.S. patent application Ser. No. 16/862,471, filed Apr. 29, 2020 and titled "APPARATUS AND METHODS FOR DYNAMIC MANAGEMENT OF ANTENNA ARRAYS" which is a continuation of U.S. patent application Ser. No. 15/834,419, filed Dec. 7, 2017 and titled "APPARATUS AND METHODS FOR DYNAMIC MANAGEMENT OF ANTENNA ARRAYS" which claims the benefit of priority under 35 U.S.C. § 119 of U.S. Provisional Patent Application No. 62/437,502, filed Dec. 21, 2016 and titled "APPARATUS AND METHODS FOR DYNAMIC MANAGEMENT OF ANTENNA ARRAYS," and of U.S. Provisional Patent Application No. 62/433,493, filed Dec. 13, 2016 and titled "APPARATUS AND METHODS FOR DYNAMIC MANAGEMENT OF ANTENNA ARRAYS," each of which is herein incorporated by reference in its entirety.

BACKGROUND

Technical Field

Embodiments of the invention relate to electronic systems, and in particular, to radio frequency (RF) electronics.

Description of Related Technology

A radio frequency (RF) communication system can include a transceiver, a front end, and one or more antennas for wirelessly transmitting and/or receiving signals. The front end can include low noise amplifier(s) for amplifying relatively weak signals received via the antenna(s), and power amplifier(s) for boosting signals for transmission via the antenna(s).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a radio frequency system. The radio frequency system includes an antenna array including a plurality of antenna elements, a plurality of signal conditioning circuits, each signal conditioning circuit operatively associated with a corresponding one of the plurality of antenna elements, and an antenna array management circuit configured to generate a plurality of enable signals each operable to individually control activation of a corresponding one of the plurality of signal conditioning circuits so as to dynamically manage the antenna array. In some embodiments, the plurality of enable signals are operable to orchestrate engagement of each of the plurality of antenna elements of the antenna array to thereby control a pattern of active antenna elements. In accordance with several embodiments, the plurality of enable signals are operable to control an amount of beam focus of the antenna array to thereby control a trade-off between a communication range of the antenna array and an off-beam capture of the antenna array.

In various embodiments, each of the plurality of signal conditioning circuits includes a power amplifier, the radio frequency system further including a power amplifier output tuning control circuit configured to tune an output impedance of each power amplifier based on the plurality of enable signals.

In several embodiments, each of the plurality of signal conditioning circuits includes a low noise amplifier, the radio frequency system further including a low noise amplifier input tuning control circuit configured to tune an input impedance of each low noise amplifier based on the plurality of enable signals.

In some embodiments, the antenna array management circuit controls a state of the plurality of enable signals based on one or more inputs indicative of a communication link of the antenna array. According to a number of embodiments, the one or more inputs includes at least one of an achieved data rate of the communication link, an observed error rate of the communication link, a receive signal strength indicator, or an indicator of geo-positioning.

In certain embodiments herein, the present disclosure relates to a module for a communications device. The module includes a laminated substrate, an antenna array formed on the laminated substrate, the antenna array including a plurality of antenna elements, and a semiconductor die attached to the laminated substrate and including a plurality of signal conditioning circuits. Each signal conditioning circuit is operatively associated with a corresponding one of the plurality of antenna elements. The semiconductor die further includes an antenna array management circuit configured to generate a plurality of enable signals each operable to individually control activation of a corresponding one of the plurality of signal conditioning circuits so as to dynamically manage the antenna array.

In some embodiments, the plurality of enable signals are operable to orchestrate engagement of each of the plurality of antenna elements of the antenna array to thereby control a pattern of active antenna elements of the antenna array. In accordance with several embodiments, the plurality of enable signals are operable to control an amount of beam focus of the antenna array to thereby control a trade-off between a communication range of the antenna array and an off-beam capture of the antenna array.

In various embodiments, each of the plurality of signal conditioning circuits includes a power amplifier, the semiconductor die further including a power amplifier output tuning control circuit configured to tune an output impedance of each power amplifier based on the plurality of enable signals.

In a number of embodiments, each of the plurality of signal conditioning circuits includes a low noise amplifier, the semiconductor die further including a low noise amplifier input tuning control circuit configured to tune an input impedance of each low noise amplifier based on the plurality of enable signals.

In accordance with some embodiments, the antenna array management circuit controls a state of the plurality of enable signals based on one or more inputs indicative of a communication link of the antenna array. According to several embodiments, the one or more inputs includes at least one of an achieved data rate of the communication link, an observed error rate of the communication link, a receive signal strength indicator, or an indicator of geo-positioning.

In a number of embodiments, the antenna array is formed on a first surface of the laminated substrate, and the semiconductor die is attached to a second surface of the laminated substrate opposite the first surface.

In several embodiments, the semiconductor die is attached to a major surface of the laminated substrate, and the antenna array includes a plurality of cavity-based antennas along an edge of the laminated substrate.

In certain embodiments herein, the present disclosure relates to a method of antenna array management. The method includes using a plurality of antenna elements of an antenna array for wirelessly communicating a plurality of radio frequency signals, the antenna array including a plurality of antenna elements each thereof wirelessly communicating a corresponding one of the plurality of radio frequency signals. The method further includes conditioning the plurality of radio frequency signals of the plurality of antenna elements using a plurality of signal conditioning circuits each thereof associated with a respective one of the plurality of radio frequency signals, generating a plurality of enable signals using an antenna array management circuit, and dynamically managing the antenna array by individually controlling activation of each of the plurality of signal conditioning circuits using a corresponding one of the plurality of enable signals.

In some embodiments, dynamically managing the antenna array includes using the plurality of enable signals to orchestrate the engagement of each of the plurality of antenna elements of the antenna array to thereby control a pattern of active antenna elements of the antenna array.

In several embodiments, the method further includes tuning an output impedance of a power amplifier of each of the plurality of signal conditioning circuits based on the pattern of active elements.

In a number of embodiments, the method further includes tuning an input impedance of a low noise amplifier of each of the plurality of signal conditioning circuits based on the pattern of active elements.

In certain embodiments herein, the present disclosure relates to a radio frequency system. The radio frequency system includes an antenna array including a plurality of antenna elements, a plurality of signal conditioning circuits operatively associated with the plurality of antenna elements, and a transceiver configured to generate a plurality of enable signals operable to individually control activation of the plurality of signal conditioning circuits so as to dynamically manage the antenna array.

In several embodiments, the plurality of enable signals are operable to orchestrate the engagement of each of the plurality of antenna elements of the antenna array.

In a number of embodiments, each of the plurality of enable signals controls whether or not a corresponding antenna element of the antenna array radiates.

In some embodiments, the plurality of enable signals control a trade-off between a number of active antenna elements of the antenna array and a power consumption to energize the antenna array.

In accordance with various embodiments, the plurality of enable signals control an amount of beam focus of the antenna array. According to a number of embodiments, the plurality of enable signals further control a trade-off between a communication range of the antenna array and an off-beam capture of the antenna array.

In some embodiments, each of the plurality of signal conditioning circuits include at least one of a power amplifier or a low noise amplifier.

In several embodiments, the plurality of antenna elements includes a plurality of patch antenna elements.

According to various embodiments, the transceiver is further configured to provide a plurality of transmit signals to the plurality of signal conditioning circuits.

In some embodiments, the transceiver is further configured to receive a plurality of receive signals from the plurality of signal conditioning circuits.

In accordance with several embodiments, the transceiver is further configured to both provide a plurality of transmit signals to the plurality of signal conditioning circuits, and to receive a plurality of receive signals from the plurality of signal conditioning circuits.

In various embodiments, the transceiver is operable to routinely update a selection of activated signal conditioning circuits based on a signaling environment of the radio frequency system.

In accordance with some embodiments, the transceiver includes an antenna management circuit that controls a selection of activated signal conditioning circuits based on one or more inputs indicative of a communication link of the antenna array. According to a number of embodiments, one or more inputs includes an achieved data rate of the communication link. In accordance with several embodiments, the one or more inputs includes an observed error rate of the communication link. According to various embodiments, the one or more inputs includes a receive signal strength indicator. In accordance with several embodiments, the one or more inputs includes an indicator of geo-positioning.

In certain embodiments herein, the present disclosure relates to a module for a communications device. The module includes a laminate, an antenna array formed on a first surface of the laminate and including a plurality of antenna elements, and one or more semiconductor dies on a second surface of the laminate opposite the first surface. The one or more semiconductor dies include a plurality of signal conditioning circuits operatively associated with the plurality of antenna elements, and an antenna array management circuit configured to generate a plurality of enable signals operable to individually control activation of the plurality of signal conditioning circuits so as to dynamically manage the antenna array.

In some embodiments, the plurality of enable signals are operable to orchestrate the engagement of each of the plurality of antenna elements of the antenna array.

In a number of embodiments, each of the plurality of enable signals controls whether or not a corresponding antenna element of the antenna array radiates.

In several embodiments, the plurality of enable signals control a trade-off between a number of active antenna elements of the antenna array and a power consumption to energize the antenna array.

In accordance with some embodiments, the plurality of enable signals control an amount of beam focus of the antenna array. According to various embodiments, the plurality of enable signals further control a trade-off between a communication range of the antenna array and an off-beam capture of the antenna array.

In a number of embodiments, each of the plurality of signal conditioning circuits include at least one of a power amplifier or a low noise amplifier.

In various embodiments, the plurality of antenna elements includes a plurality of patch antenna elements.

In several embodiments, the module further includes a transceiver that includes the antenna array management circuit.

In accordance with a number of embodiments, the transceiver is further configured to provide a plurality of transmit signals to the plurality of signal conditioning circuits.

In some embodiments, the transceiver is further configured to receive a plurality of receive signals from the plurality of signal conditioning circuits.

In various embodiments, the transceiver is further configured to both provide a plurality of transmit signals to the plurality of signal conditioning circuits, and to receive a plurality of receive signals from the plurality of signal conditioning circuits.

In several embodiments, the transceiver is operable to routinely update a selection of activated signal conditioning circuits based on a signaling environment.

In a number of embodiments, the antenna management circuit controls a selection of activated signal conditioning circuits based on one or more inputs indicative of a communication link of the antenna array. In accordance with some embodiments, the one or more inputs includes an achieved data rate of the communication link. According to several embodiments, the one or more inputs includes an observed error rate of the communication link. In accordance with various embodiments, the one or more inputs includes a receive signal strength indicator. According to some embodiments, the one or more inputs includes an indicator of geo-positioning.

In certain embodiments, the present disclosure relates to a method of antenna array management. The method includes using a plurality of antenna elements of an antenna array for at least one of transmitting signals or receiving signals, conditioning the signals of the plurality of antenna elements using a plurality of signal conditioning circuits, generating a plurality of enable signals using an antenna array management circuit, and dynamically managing the antenna array by individually controlling activation of the plurality of signal conditioning circuits using the plurality of enable signals.

In some embodiments, dynamically managing the antenna array includes using the plurality of enable signals to orchestrate the engagement of each of the plurality of antenna elements of the antenna array.

In various embodiments, dynamically managing the antenna array includes using the plurality of enable signals to control whether or not each of the plurality of antenna elements of the antenna array radiates.

In a number of embodiments, the method further includes controlling a tradeoff between a number of active antenna elements of the antenna array and a power consumption to energize the antenna array using the plurality of enable signals.

In several embodiments, the method further includes controlling an amount of beam focus of the antenna array using the plurality of enable signals.

According to various embodiments, the method further includes controlling a trade-off between a communication range of the antenna array and an off-beam capture of the antenna array using the plurality of enable signals.

In a number of embodiments, the method further includes deactivating one or more antenna elements to defocus the antenna array to enable communications with an off-beam device.

In some embodiments, the method further includes controlling a selection of activated signal conditioning circuits based on one or more inputs indicative of a communication link of the antenna array. In accordance with several embodiments, the one or more inputs includes an achieved data rate of the communication link. According to a number of embodiments, the one or more inputs includes an observed error rate of the communication link. In accordance with various embodiments, the one or more inputs includes a receive signal strength indicator. According to several embodiments, the one or more inputs includes an indicator of geo-positioning.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
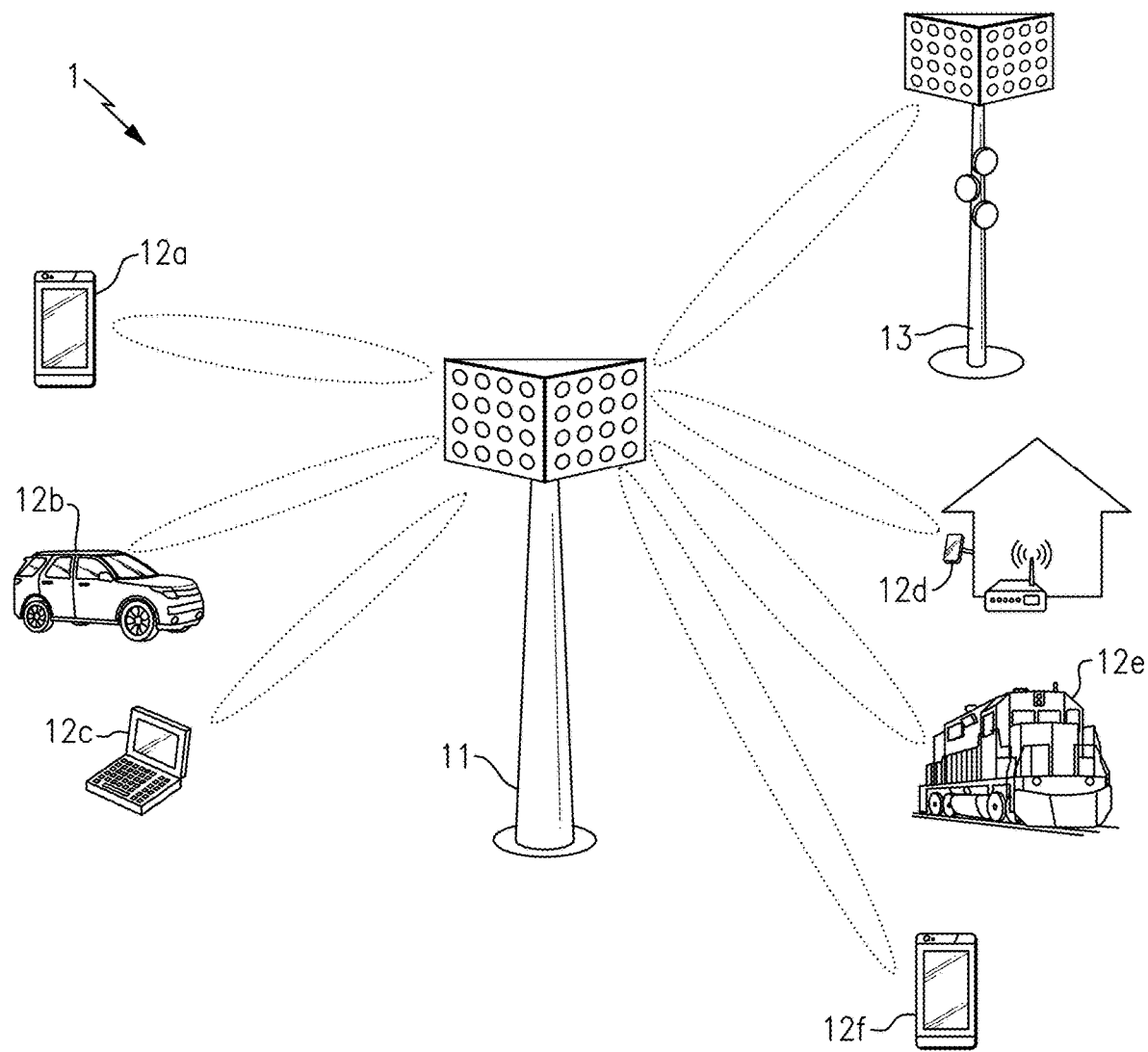
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet-of-Things (NB-IOT), Vehicle-to-Everything (V2X), and High Power User Equipment (HPUE).

3GPP plans to introduce Phase 1 of fifth generation (5G) technology in Release 15 (targeted for 2018) and Phase 2 of 5G technology in Release 16 (targeted for 2019). Release 15 is anticipated to address 5G communications at less than 6 gigahertz (GHz), while Release 16 is anticipated to address communications at 6 GHz and higher. Subsequent 3GPP releases will further evolve and expand 5G technology. 5G technology is also referred to herein as 5G New Radio (NR).

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 1. The communication network 1 includes a macro cell base station 11, a small cell base station 13, and various examples of user equipment (UE), including a first mobile device 12a, a wireless-connected car 12b, a laptop 12c, a stationary wireless device 12d, a wireless-connected train 12e, and a second mobile device 12f.

Although specific examples of base stations and user equipment are illustrated in FIG. 1, a communication network can include base stations and user equipment of a wide variety of types and/or numbers.

For instance, in the example shown, the communication network 1 includes the macro cell base station 11 and the small cell base station 13. The small cell base station 13 can operate with relatively lower power, shorter range, and/or with fewer concurrent users relative to the macro cell base station 11. The small cell base station 13 can also be referred to as a femtocell, a picocell, or a microcell. Although the communication network 1 is illustrated as including two base stations, the communication network 1 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices.

The illustrated communication network 1 of FIG. 1 supports communications using a variety of technologies, including, for example, 4G LTE, 5G NR, and wireless local area network (WLAN), such as Wi-Fi. Although various examples of communication technologies have been provided, the communication network 1 can be adapted to support a wide variety of communication technologies.

Various communication links of the communication network 1 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communication with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 1 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 1 of FIG. 1 can be used to support a wide variety of advanced communication features, including, but not limited to, eMBB, uRLLC, and/or mMTC.

Examples of Dynamic Management of Antenna Arrays

Antenna arrays, such as patch antenna arrays, can be used in a wide variety of applications. In one example, an antenna array is included on a module of a communications device. For instance, antenna arrays can be used to transmit and/or receive radio frequency (RF) signals in base stations, network access points, mobile phones, tablets, laptops, computers, and/or other communications devices. Moreover, in certain implementations, separate antenna arrays are deployed for transmission and reception.

Communications devices that utilize millimeter wave carriers (for instance, 30 GHz to 300 GHz), centimeter wave carriers (for instance, 3 GHz to 30 GHz), and/or other carrier frequencies can employ an antenna array to provide beam formation and directivity for transmission and/or reception of signals. For example, in the context of signal transmission, an antenna array of m×n patch antenna elements (for instance, a 4×4 array) can be implemented in a planar module with each antenna element of the array radiating signals independently. Additionally, the signals from the antenna elements combine using constructive and destructive interference to generate an aggregate transmit signal exhibiting beam-like qualities with more signal strength propagating in a given direction away from the antenna array.

In the context of signal reception, more signal energy is received by the antenna array when the signal is arriving from a particular direction. Accordingly, an antenna array can also provide directivity for reception of signals.

The relative concentration of signal energy into a beam can be enhanced by increasing the size of the array, up to a limit. For example, with more signal energy focused into a transmitted beam, the signal is able to propagate for a longer range while providing sufficient signal level for RF communications. For instance, a signal with a large proportion of signal energy focused into the transmitted beam can exhibit high effective isotropic radiated power (EIRP).

A signal conditioning circuit can be used to condition a transmit signal for transmission via an antenna element and/or to condition a received signal from the antenna element. In one example, a signal conditioning circuit includes a power amplifier that amplifies the transmit signal to a power level suitable for transmission, and a low noise amplifier (LNA) that amplifies the received signal for further processing while introducing a relatively small amount of noise.

The signal conditioning circuits of a communications device consume power when activated. Thus, electronic circuitry that supports each antenna element of an array consumes power to function. For instance, when each antenna element transmits with the same signal power, an array of antenna 16 elements consumes more power than an array of 4 elements.

Accordingly, there is a trade-off between the size of the array and the power consumption to energize the array. Moreover, using a larger array increases the amount of beam focus, and thus a receiver that is not sufficiently close to the center of the beam may not be able to receive enough signal strength to enable communications. Accordingly, there is an additional trade-off between the degree of signal focus corresponding to the size of array deployed and the ability of the communication channel to communicate with other devices that are not in the beam path.

Apparatus and methods for dynamic management of antenna arrays are provided herein. In certain configurations, an RF system includes an antenna array including a plurality of antenna elements. The RF system further includes a plurality of signal conditioning circuits operatively associated with the antenna elements, and an antenna array management circuit that generates a plurality of enable signals that individually control activation of the signal conditioning circuits to dynamically manage the antenna array.

Accordingly, an array of antenna elements can be dynamically managed to control a trade-off between power consumption, off-beam capture, and communication range/rate.

For example, the number of active antenna elements can be dynamically controlled to provide an antenna range suitable for a given operating environment at a given time. For example, with respect to an m×n antenna array, all m*n antenna elements can be used at one time instance, while less than all elements (for instance, inner antenna elements of the array) can be used when the target is relatively close. When less than all of the antenna elements are being used, the signal conditioning circuits of inactive antenna elements can be disabled to reduce system power.

In certain implementations, the transceiver includes an antenna array management circuit that controls a state of the enable signals based on one or more inputs indicative of a communication link between the antenna array and another communications device. Thus, the antenna array management circuit is used to control which of the signal conditioning circuits are active and a corresponding pattern of active antenna elements of the antenna array.

Dynamic management and optimization of the array usage when transmitting and/or receiving can be based on a number of signaling factors and/or feedback signals indicative of the communication link. Examples of suitable inputs to the antenna array management circuit include data rate achieved between the communications devices, error rates, receive signal strength indicators, and/or geo-positioning of one communications device relative to the other communications device (and thereby proximity).

The antenna arrays herein can be used to transmit and/or receive signals of a wide range of frequencies, including, for example, a frequency range of about 30 kHz to 300 GHz, such as in the range of about 500 MHz to about 20 GHz for certain communications standards.

In certain embodiments, the antenna array is implemented on a laminated substrate, with an array of planar antenna elements formed using a patterned conductive layer on a first side of the laminated substrate. Additionally, a ground plane is formed using a conductive layer on a second opposing side of the laminated substrate or internal to the laminated substrate.

Figure 2A:
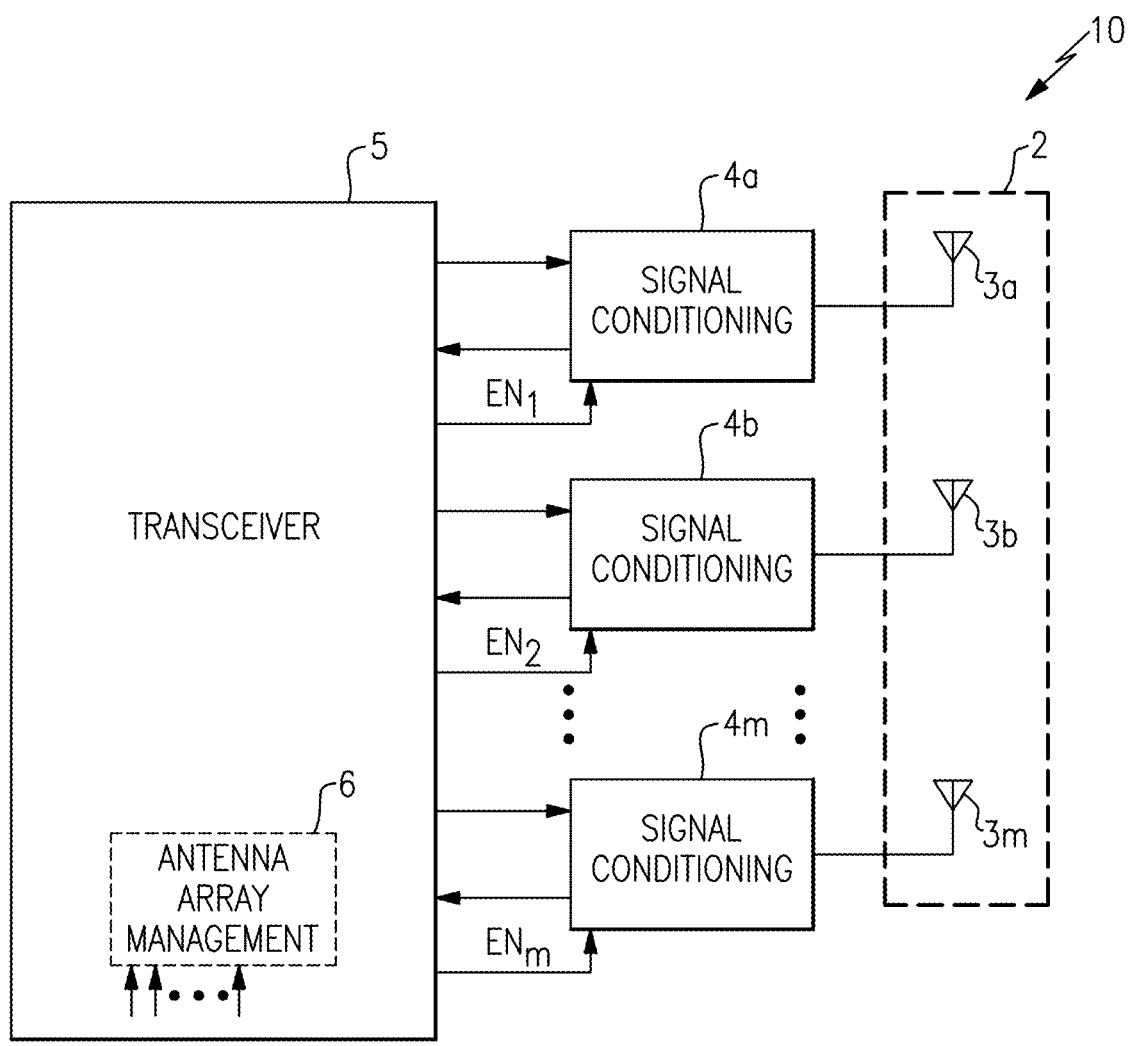
FIG. 2A is a schematic diagram of one embodiment of a radio frequency (RF) system with dynamic antenna array management.

FIG. 2A is a schematic diagram of one embodiment of an RF system 10 with dynamic antenna array management. The RF system 10 includes an antenna array 2 including antenna elements 3a, 3b . . . 3m. The RF system 10 further includes signal conditioning circuits 4a, 4b . . . 4m, and a transceiver 5 that includes an antenna array management circuit 6.

Although an embodiment with three antenna elements and corresponding signal conditioning circuits is shown, an RF system can more or fewer antenna elements and/or signal conditioning circuits as indicated by the ellipses.

In the illustrated embodiment, each signal conditioning circuit 4a, 4b . . . 4m is coupled to a corresponding one of the antenna elements 3a, 3b . . . 3m. The signal conditioning circuits can be used to condition signals for transmission and/or reception via the antenna array 2.

Although an embodiment in which the conditioning circuits 4a, 4b . . . 4m provide signal conditioning for both transmission and reception, other implementations are possible. For example, in certain implementations, a communications device includes separate arrays for receiving signals and for transmitting signals. Thus, in certain implementations, a signal conditioning circuit is used for transmit conditioning but not receive conditioning, or for receive conditioning but not transmit conditioning.

As shown in FIG. 2A, the transceiver generates enable signals $EN_1$, $EN_2$ . . . $EN_m$ for individually controlling activation of the signal conditioning circuits 4a, 4b . . . 4m, respectively.

Accordingly, the transceiver 5 dynamically manages the antenna array 2 by selectively enabling the signaling conditioning circuits 4a, 4b . . . 4m. By controlling the number and pattern of active antenna elements, the shape of the beam is controlled. Thus, the transceiver 5 controls a trade-off between power consumption, off-beam capture, and RF communication range/rate.

As shown in FIG. 2A, the transceiver 5 includes the antenna array management circuit 6, which controls the active antenna elements of the antenna array 2 based on a given operating environment at a given time. The particular antenna elements activated by the transceiver 5 change over time, and thus the transceiver 5 reconfigures the antenna array 2 to provide desired performance characteristics at a given moment.

For example, the state of the enable signals $EN_1$, $EN_2$ . . . $EN_m$ can be controlled to provide an optimal or near-optimal beam for a given operating environment at a given time. Thus, seamless connectivity between a pair of communications devices can be provided as the devices move relative to one another and/or a signaling environment changes.

The antenna array management circuit 6 receives one or more inputs used to control selection of a state of the enable signals $EN_1$, $EN_2$ . . . $EN_m$. The inputs can include a number of signaling factors and/or feedback signals indicative of a communication link (transmit and/or receive) of the antenna array 2. Examples of suitable inputs to the antenna array management circuit include a data rate achieved, an observed error rate, a receive signal strength indicator (RSSI), and/or an indicator of geo-positioning. Accordingly, the inputs can include signals and/or parameters received from another device in which the RF system 10 is in communication with.

In the illustrated embodiment, the antenna array management circuit 6 controls the enable signals $EN_1$, $EN_2$ . . . $EN_m$ to focus/de-focus the beam of the antenna array 2. Thus, not only do the enable signals $EN_1$, $EN_2$ . . . $EN_m$ control a trade-off between a number of active antenna elements and a power consumption to energize the antenna array 2, but also a trade-off between a communication range of the antenna array 2 and an off-beam capture of the antenna array 2.

Figure 2B:
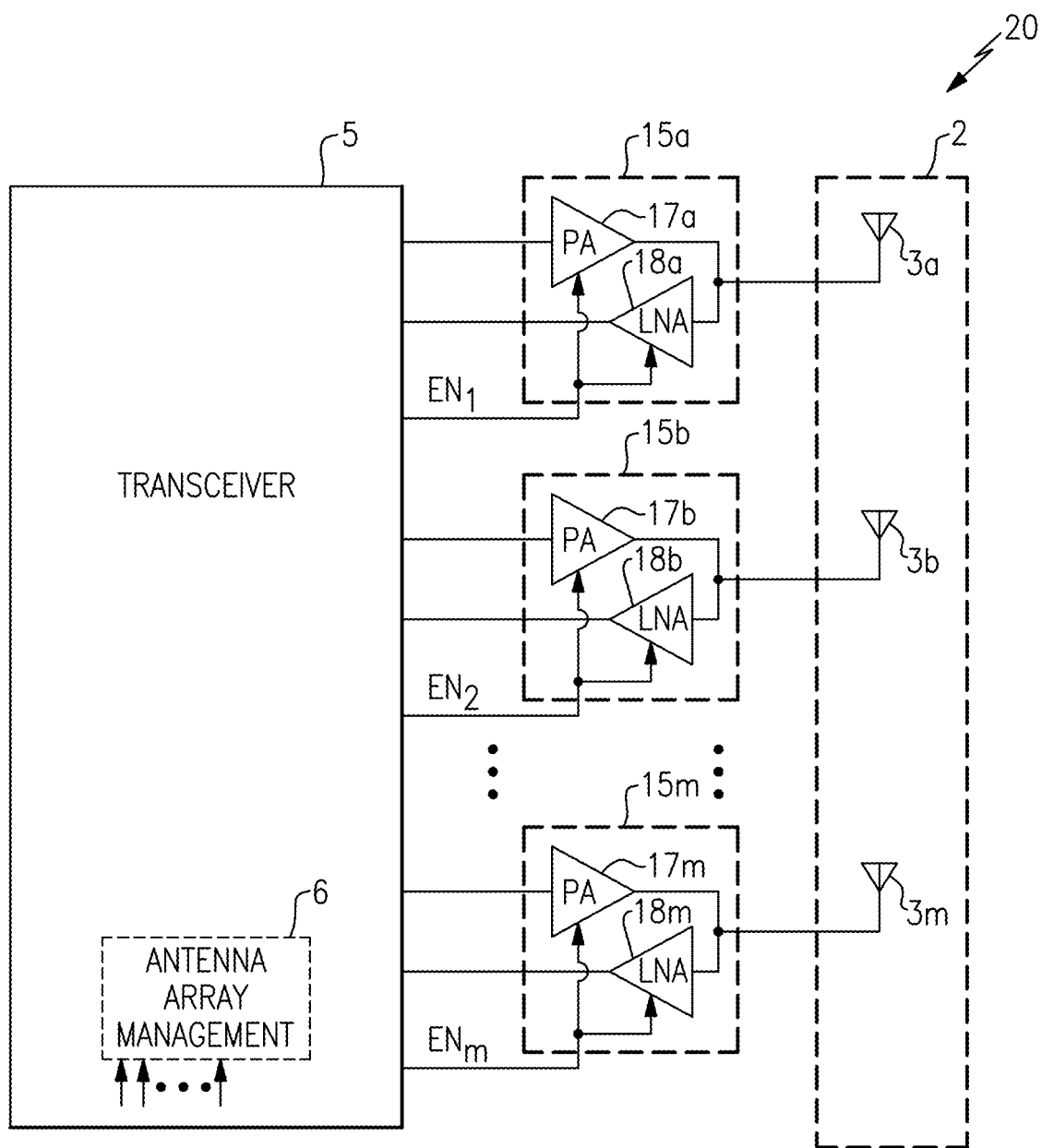
FIG. 2B is a schematic diagram of another embodiment of an RF system with dynamic antenna array management.

FIG. 2B is a schematic diagram of another embodiment of an RF system 20 with dynamic antenna array management. The RF system 20 includes an antenna array 2, signal conditioning circuits 15a, 15b . . . 15m, and a transceiver 5.

The RF system 20 of FIG. 2A is similar to the RF system 10 of FIG. 2B, except that the RF system 20 includes a specific implementation of signal conditioning circuits. In particular, the signaling conditions circuits 15a, 15b . . . 15m of FIG. 2B include power amplifiers 17a, 17b . . . 17m and LNAs 18a, 18b . . . 18m, respectively.

Although an example of signaling conditioning circuits with power amplifiers and LNAs is shown, other implementations of signaling conditioning circuits are possible. For example, a signaling conditioning circuit can include other circuitry used to enable the intended RF communication channel between devices, including, but not limited to, filters, attenuators, phase shifters, switches, and/or other circuitry. Moreover, in certain implementations, a signaling conditioning circuit includes transmit conditioning circuitry (for instance, a power amplifier) but not receive conditioning circuitry, or includes receive conditioning circuitry (for instance, an LNA) but not transmit conditioning circuitry.

Figure 3A:
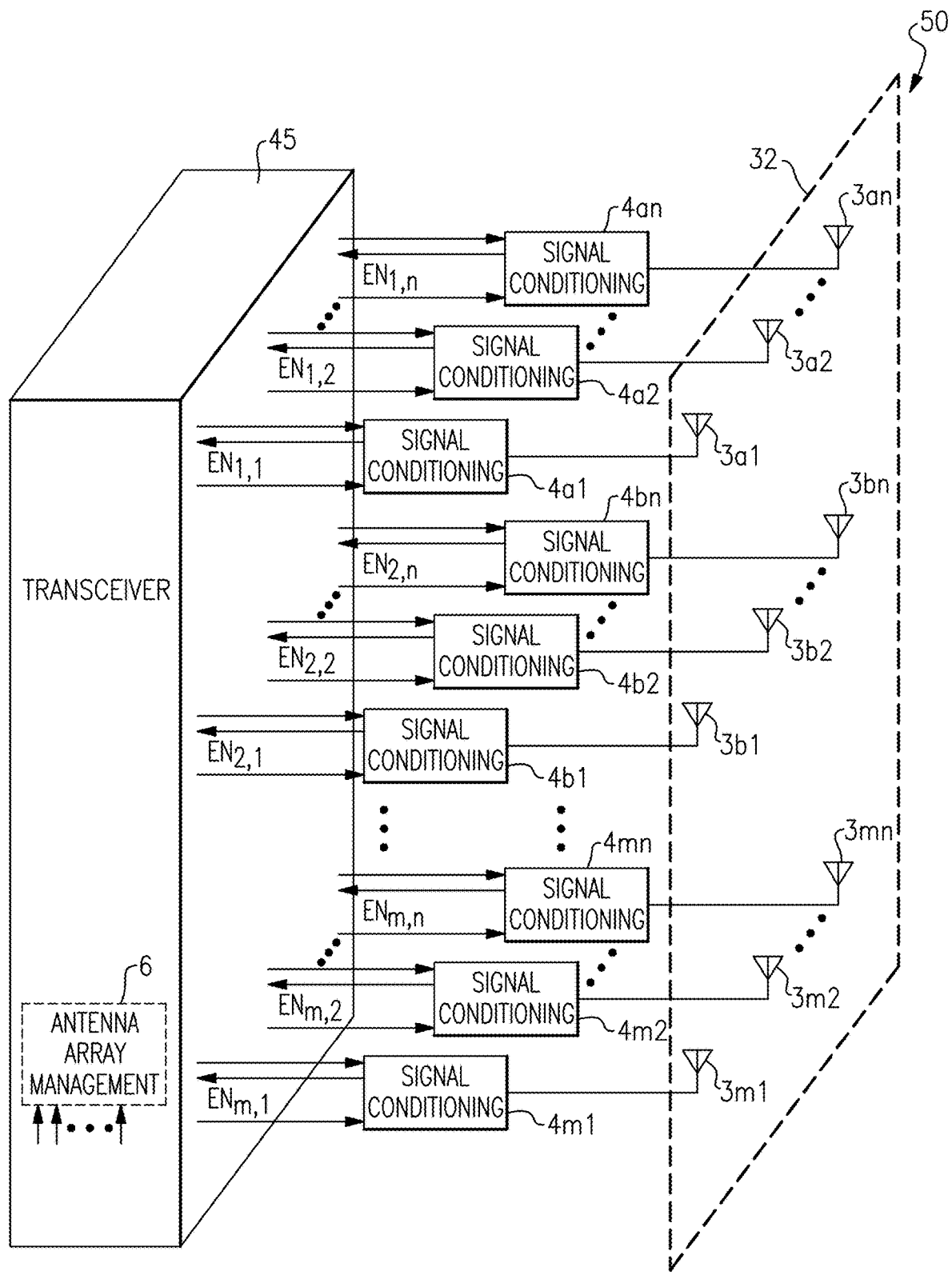
FIG. 3A is a schematic diagram of another embodiment of an RF system with dynamic antenna array management.

FIG. 3A is a schematic diagram of another embodiment of an RF system 50 with dynamic antenna array management.

The RF system 50 includes an antenna array 32 including antenna elements $3a1, 3a2 \ldots 3an, 3b1, 3b2 \ldots 3bn, 3m1, 3m2 \ldots 3mn$. The RF system 50 further includes signal conditioning circuits $4a1, 4a2 \ldots 4an, 4b1, 4b2 \ldots 4bn, 4m1, 4m2 \ldots 4mn$. The RF system 50 further includes a transceiver 45 that generates enable signals $EN_{1,1}, EN_{1,2} \ldots EN_{1,n}, EN_{2,1}, EN_{2,2} \ldots EN_{2,n}, EN_{m,1}, EN_{m,2} \ldots EN_{m,n}$ for the signal conditioning circuits $4a1, 4a2 \ldots 4an, 4b1, 4b2 \ldots 4bn, 4m1, 4m2 \ldots 4mn$, respectively.

The RF system 50 of FIG. 3A is similar to the RF system 10 of FIG. 2A, except that the RF system 50 illustrates a specific implementation using an m×n antenna array 32 and corresponding signal conditioning circuits, where m and n are integers greater than or equal to 1. The product of m*n can vary depending on application. In one embodiment, m*n is in the range of 2 to 2048, or more particular, 16 to 256.

Figure 3B:
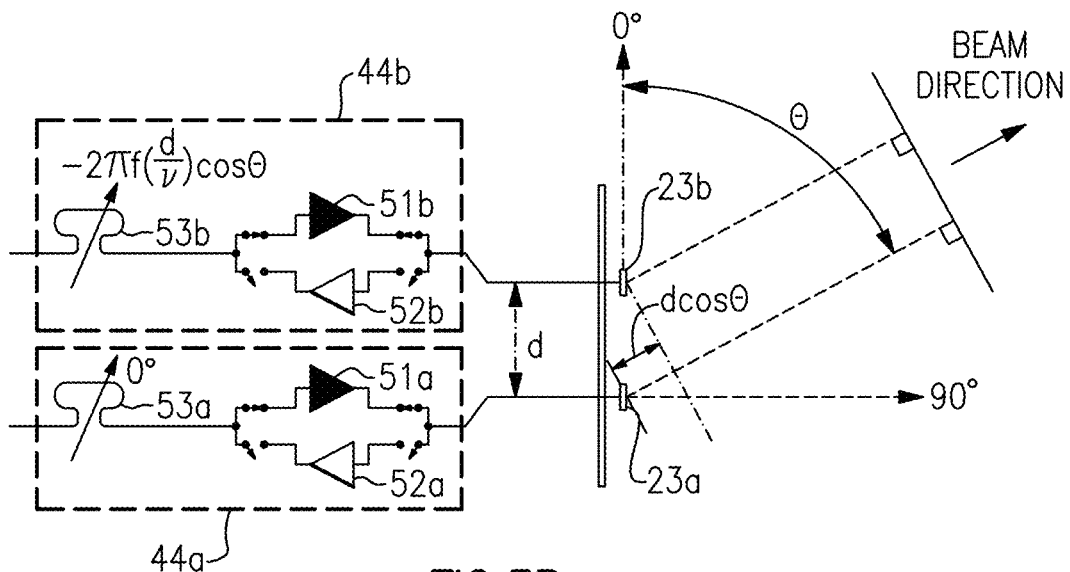
FIG. 3B is a schematic diagram of one example of beamforming to provide a transmit beam.

FIG. 3B is a schematic diagram of one example of beamforming to provide a transmit beam. FIG. 3B illustrates a portion of a communication system including a first signal conditioning circuit 44a, a second signal conditioning circuit 44b, a first antenna element 23a, and a second antenna element 23b.

Although illustrated as included two antenna elements and two signal conditioning circuits, a communication system can include additional antenna elements and/or signal conditioning circuits. For example, FIG. 3B illustrates one embodiment of a portion of the communication system 50 of FIG. 3A.

The first signal conditioning circuit 44a includes a first power amplifier 51a, a first low noise amplifier (LNA) 52a, a first phase shifter 53a, and switches for controlling selection of the power amplifier 51a or LNA 52a. Additionally, the second signal conditioning circuit 44b includes a second power amplifier 51b, a second LNA 52b, a second phase shifter 53b, and switches for controlling selection of the power amplifier 51b or LNA 52b.

Although one embodiment of signal conditioning circuits is shown, other implementations of signal conditioning circuits are possible. For instance, in one example, a signal conditioning circuit includes one or more band filters, duplexers, and/or other components. Furthermore, although an implementation with an analog phase shifter is shown, the teachings herein are also applicable to implementations using digital phase shifting (for instance, phase shifting using digital baseband processing) as well as to implementations using a combination of analog phase shifting and digital phase shifting.

In the illustrated embodiment, the first antenna element 23a and the second antenna element 23b are separated by a distance d. Additionally, FIG. 3B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 23a, 23b, a desired transmit beam angle θ can be achieved. For example, when the first phase shifter 53a has a reference value of 0°, the second phase shifter 53b can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about $\frac{1}{2}\lambda$, where λ is the wavelength of the fundamental component of the transmit signal. In such implementations, the second phase shifter 53b can be controlled to provide a phase shift of about $-\pi\cos\theta$ radians to achieve a transmit beam angle θ.

Accordingly, the relative phase of the phase shifters 53a, 53b can be controlled to provide transmit beamforming. In certain implementations, a transceiver (for example, the transceiver 45 of FIG. 3A) controls phase values of one or more phase shifters to control beamforming.

Figure 3C:
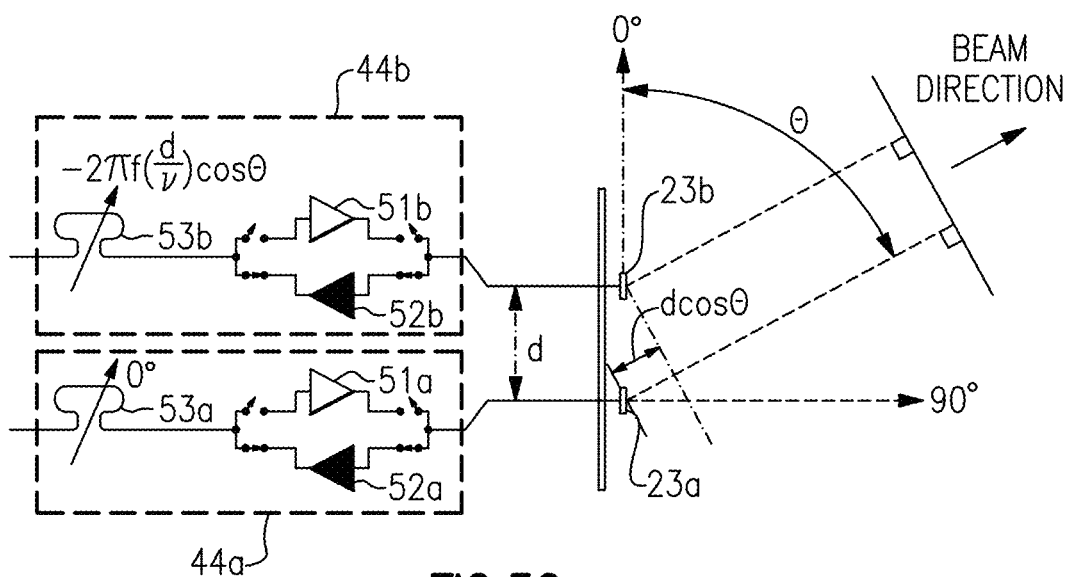
FIG. 3C is a schematic diagram of one example of beamforming to provide a receive beam.

FIG. 3C is a schematic diagram of one example of beamforming to provide a receive beam. FIG. 3C is similar to FIG. 3B, except that FIG. 3C illustrates beamforming in the context of a receive beam rather than a transmit beam.

As shown in FIG. 3C, a relative phase difference between the first phase shifter 53a and the second phase shifter 53b can be selected to about equal to $-2\pi f(d/v)\cos\theta$ radians to achieve a desired receive beam angle θ. In implementations in which the distance d corresponds to about $\frac{1}{2}\lambda$, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Figure 4A:
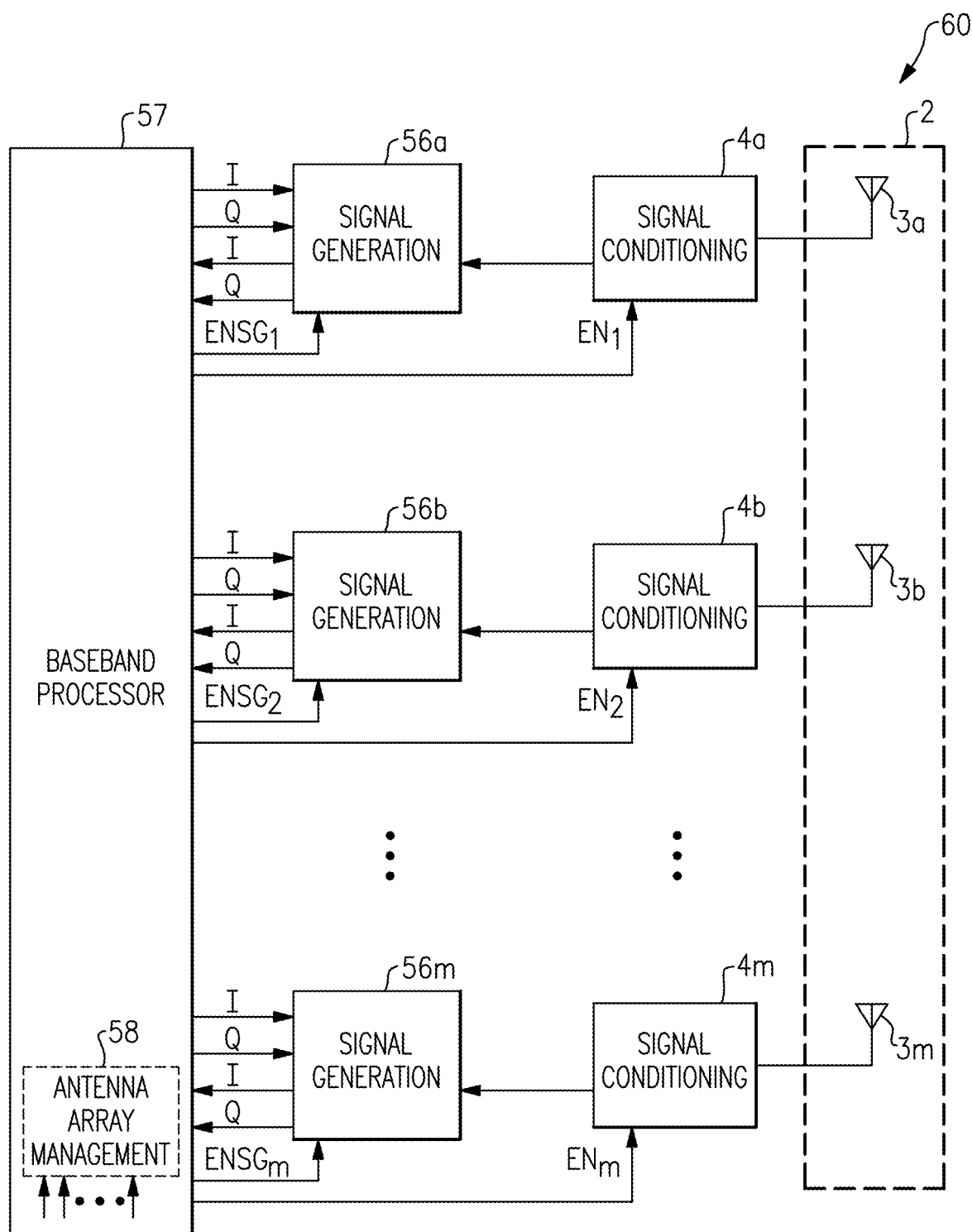
FIG. 4A is a schematic diagram of another embodiment of an RF system with dynamic antenna array management.

FIG. 4A is a schematic diagram of another embodiment of an RF system 60 with dynamic antenna array management. The RF system 60 includes an antenna array 2, signal conditioning circuits $4a, 4b \ldots 4m$, signal generation circuits $56a, 56b \ldots 56m$, and a baseband processor 57.

The RF system 60 of FIG. 4A is similar to the RF system 10 of FIG. 2A, except that the RF system 60 of FIG. 4A includes signal generation circuits $56a, 56b \ldots 56m$ and a baseband processor 57 that includes an antenna array management circuit 58. Although shown as being included in the baseband processor 57, the antenna array management circuit 58 can be in any suitable location.

In the illustrated embodiment, the signal generation circuits $56a, 56b \ldots 56m$ are coupled to corresponding signal conditioning circuits $4a, 4b \ldots 4m$, respectively. Accordingly, in this embodiment, signal generation circuits and signal conditioning circuits are one-to-one in ratio. However, other implementations are possible, such as configurations in which a signal generation circuit is shared by multiple signal conditioning circuits.

As shown in FIG. 4A, the baseband processor 57 communicates digital in-phase (I) and quadrature-phase (Q) signals with the signal generation circuits $56a, 56b \ldots 56m$. The baseband processor 57 also generates signal generation enable signals $ENSG_1, ENSG_2 \ldots ENSG_m$. In certain implementations, signal generation circuits are individually controlled to further enhance power management.

Figure 4B:
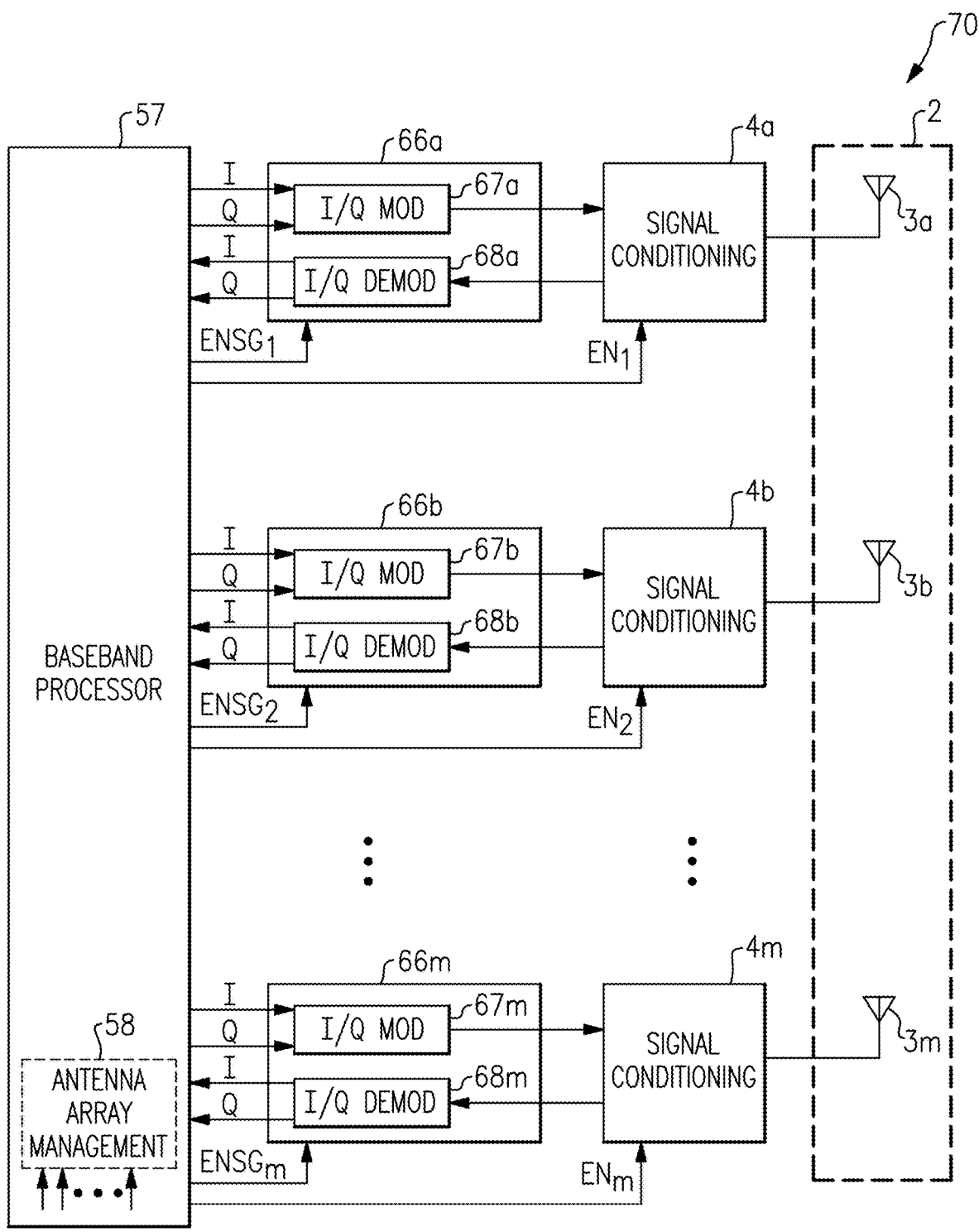
FIG. 4B is a schematic diagram of another embodiment of an RF system with dynamic antenna array management.

FIG. 4B is a schematic diagram of another embodiment of an RF system 70 with dynamic antenna array management. The RF system 70 includes an antenna array 2, signal conditioning circuits $4a, 4b \ldots 4m$, signal generation circuits $66a, 66b \ldots 66m$ and a baseband processor 57.

The RF system 70 of FIG. 4B is similar to the RF system 60 of FIG. 4A, except that the RF system 70 illustrates a specific implementation of signal generation circuits. In particular, the signal generation circuits $66a, 66b \ldots 66m$ of FIG. 4B include I/Q modulators $67a, 67b \ldots 67m$ and I/Q demodulators $68a, 68b \ldots 68m$, respectively.

Although the signal generation circuits $66a, 66b \ldots 66m$ of FIG. 4B illustrate one example of signaling generation circuits for a transceiver, other implementations are possible.

Figure 5:
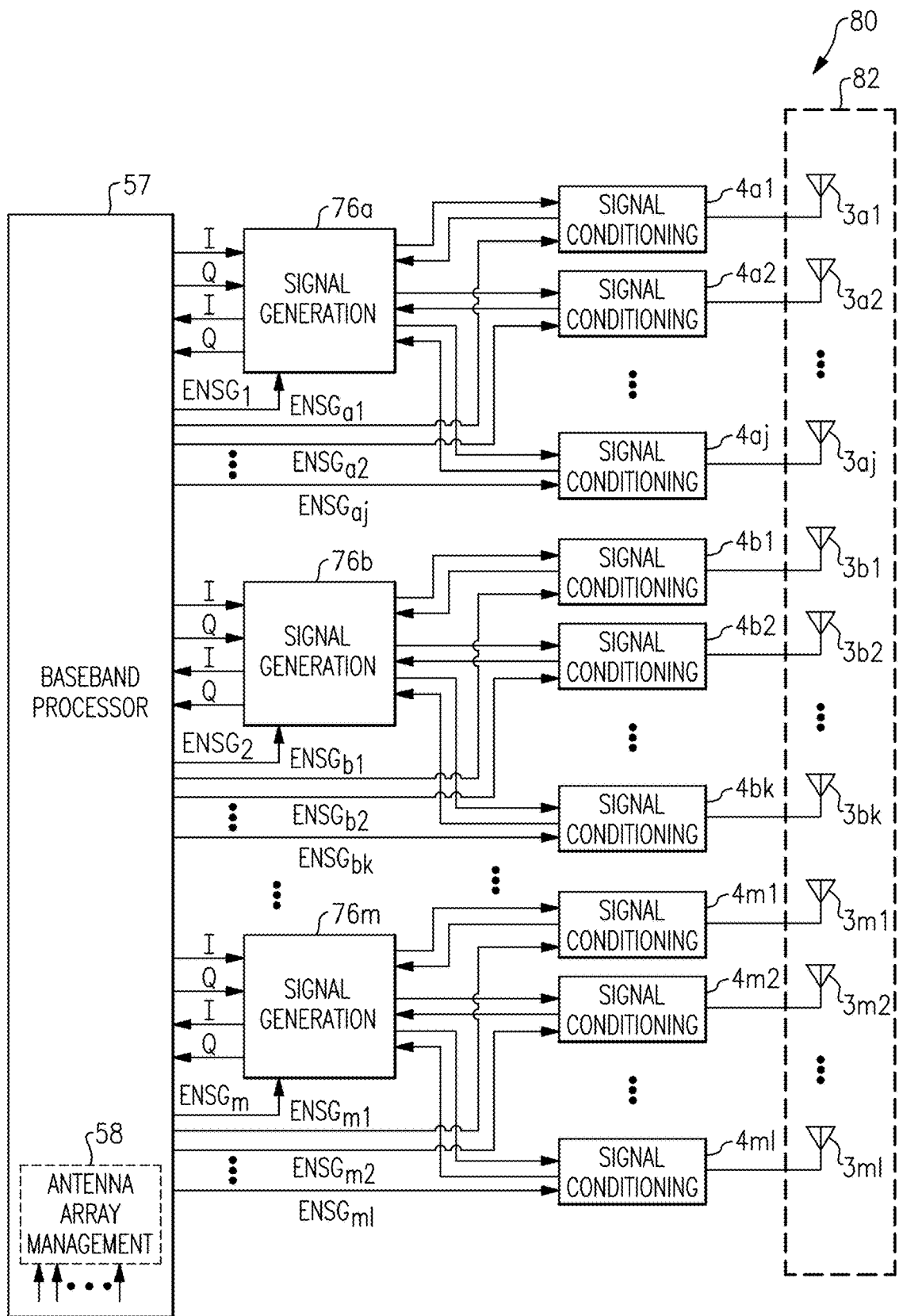
FIG. 5 is a schematic diagram of another embodiment of an RF system with dynamic antenna array management.

FIG. 5 is a schematic diagram of another embodiment of an RF system 80 with dynamic antenna array management. The RF system 80 includes an antenna array 82 including antenna elements 3a1, 3a2 . . . 3aj, 3b1, 3b2 . . . 3bk, 3m1, 3m2 . . . 3ml. Additionally, the RF system 80 includes signal conditioning circuits 4a1, 4a2 . . . 4aj, 4b1, 4b2 . . . 4bk, 4m1, 4m2 . . . 4ml. Furthermore, the RF system 80 includes a baseband processor 57 and signal generation circuits 76a, 76b . . . 76m. In certain implementations, j, k, l, and m are integers greater than 1, of the same or different values.

As shown in FIG. 5, the antenna array management circuit 58 generates enable signals $ENSG_1$, $ENSG_2$ . . . $ENSG_m$ for the signal generation circuits 76a, 76b . . . 76m, respectively. Additionally, the antenna array management circuit 58 generates enable signals $ENa_1$, $ENa_2$ . . . $EN_{aj}$ for the signal conditioning circuits 4a1, 4a2 . . . 4aj, respectively. Furthermore, the antenna array management circuit 58 generates enable signals $EN_{b1}$, $EN_{b2}$ . . . $EN_{bk}$ for the signal conditioning circuits 4b1, 4b2 . . . 4bk, respectively. Additionally, the antenna array management circuit 58 generates enable signals $EN_{m1}$, $EN_{m2}$ . . . $EN_{m2}$ for the signal conditioning circuits 4m1, 4m2 . . . 4ml, respectively.

The RF system 80 of FIG. 5 is similar to the RF system 60 of FIG. 4A, except the RF system 80 illustrates an implementation in which multiple signal conditioning circuits are controlled by a common signal generation circuit. Implementing an RF system with shared signal generation circuitry can reduce power, complexity, component number, and/or cost relative to an implementation in which each signal conditioning circuit includes a dedicated signal generation circuit.

Figure 6A:
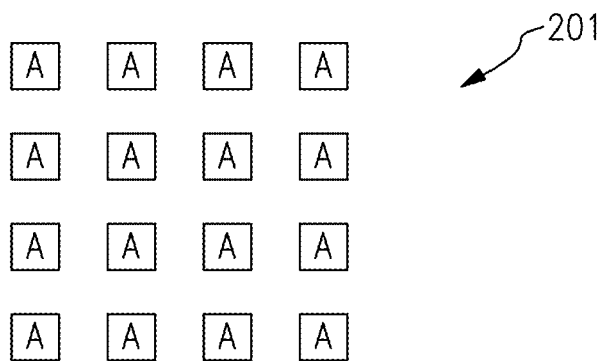
FIGS. 6A-6C are schematic diagrams of three examples of activated antenna elements of an antenna array.
Figure 6B:
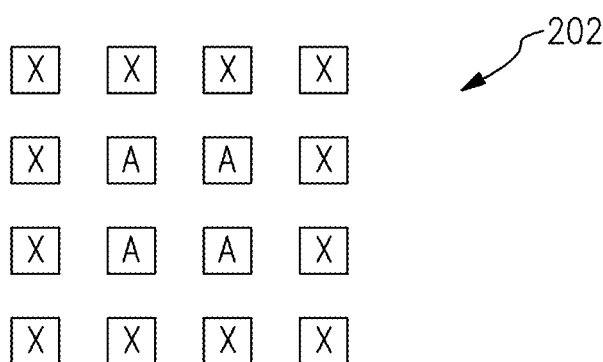
Figure 6C:
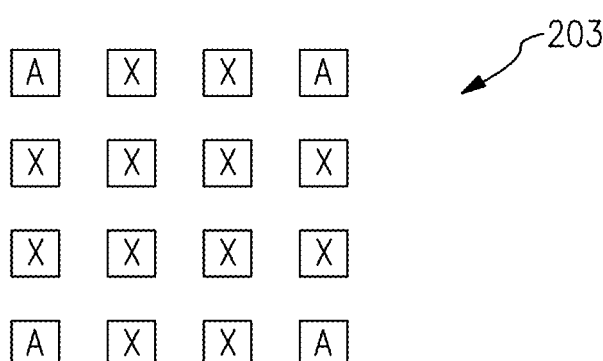

FIGS. 6A-6C are schematic diagrams of three examples of activated antenna elements of an antenna array. The three examples are illustrated for an implementation of a dynamically controlled 4×4 antenna array. However, the teachings herein are applicable to other array sizes.

FIG. 6A illustrates an antenna configuration 201 in which all antenna elements of the 4×4 array are activated (designated with an "A"). Implementing the array in this manner can provide a focused beam that may have the best range to establish radio frequency communications and/or which may have a highest data rate when the other device is in-line with the beam.

FIG. 6B illustrates an antenna configuration 202 in which the inner 4 antenna elements of the 4×4 array are activated (designated with an "A"), and the outer antenna elements are deactivated (designated with an "X").

By deactivating the outer antenna elements via disabling corresponding signal conditioning circuits, the beam generated by the antenna array becomes defocused relative to the antenna configuration 201 of FIG. 6A. The inventor has recognized that although a focused beam may exhibit the greatest range, a focused beam may also exhibit the least or relatively poor ability to establish a communication channel with another device that is not centered on the beam path.

Accordingly, by controlling which antenna elements are activated in an antenna array, a desired trade-off between a communication range and an off-beam capture of the antenna array can be realized.

FIG. 6C illustrates an antenna configuration 203 in which the 4 corner antenna elements of the 4×4 array are activated (designated with an "A"), and the remaining elements are deactivated (designated with an "X"). The antenna configuration 203 illustrates another example of an array configuration that is de-focused relative to the antenna configuration 201 of FIG. 6A.

Figure 7A:
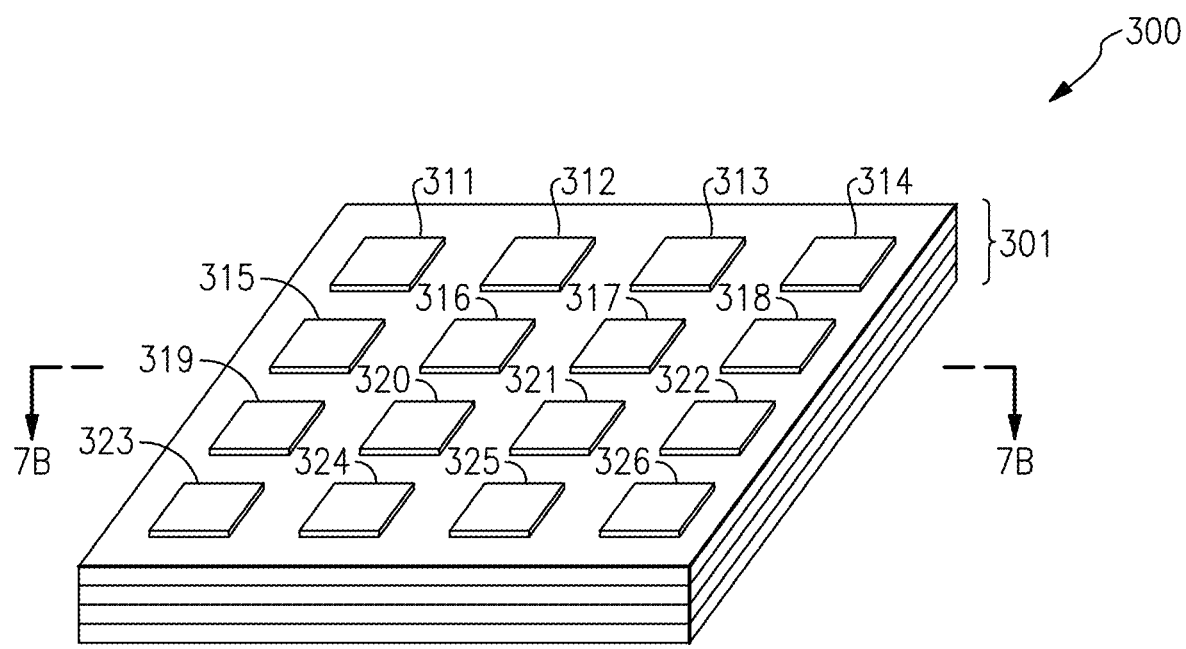
FIG. 7A is a perspective view of one embodiment of a module with dynamic antenna array management.
Figure 7B:
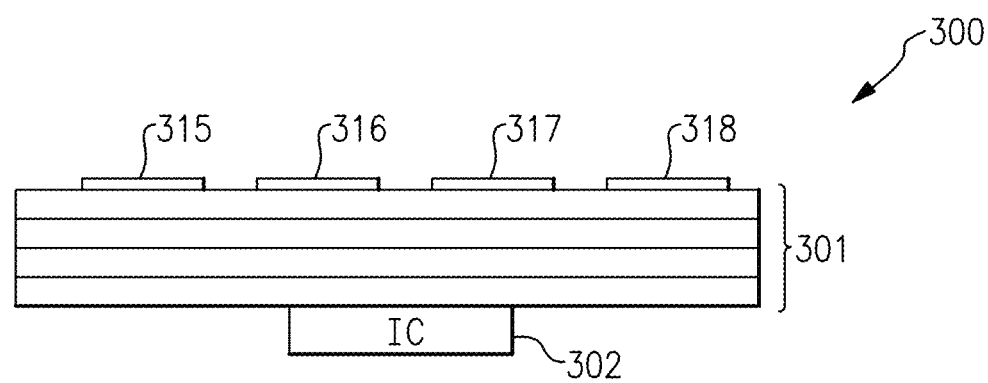
FIG. 7B is a cross-section of the module of FIG. 7A taken along the lines 7B-7B.

FIG. 7A is a perspective view of one embodiment of a module 300 with dynamic antenna array management. FIG. 7B is a cross-section of the module 300 of FIG. 7A taken along the lines 7B-7B.

The module 300 includes a laminated substrate or laminate 301, a semiconductor die or IC 302 and (not visible in FIG. 7A), and an antenna array including patch antenna elements 311-326. Although an example with patch antenna elements is illustrated, the teachings herein are applicable to antenna elements implemented in a wide variety of ways. For instance, examples of antenna elements include, but are not limited to, patch antennas, dipole antennas, ceramic resonators, stamped metal antennas, and/or laser direct structuring antennas.

Although not shown in FIGS. 7A and 7B, the module 300 can include additional structures and components that have been omitted from the figures for clarity.

The patch antenna elements 311-326 are formed on a first surface of the laminate 301, and can be used to transmit and/or receive signals. Although the illustrated patch antenna elements 311-326 are rectangular, the patch antenna elements can be shaped in other ways. Additionally, although a 4×4 array of antenna elements is shown, more or fewer patch antenna elements are possible. Moreover, antenna elements can be arrayed in other patterns or configurations, including, for instance, linear arrays and/or arrays using non-uniform arrangements of antenna elements. In certain embodiments, multiple patch antenna arrays are provided, such as separate patch antenna arrays for transmit and receive.

In the illustrated embodiment, the IC 302 is on a second surface of the laminate 301 opposite the first surface.

In certain implementations, the IC 302 includes a transceiver and/or signal conditioning circuits associated with the patch antenna elements 311-326. Although an implementation with one semiconductor chip is shown, the teachings herein are applicable to implementations with additional chips as well as to implementations without chips.

Accordingly, the IC 302 can control the number of active antenna elements. In one embodiment, the IC 302 includes an interface, such as a Mobile Industry Processor Interface (MIPI) and/or a general-purpose input/output (GPIO) interface that receive data for controlling selection of the particular antenna elements that are active.

The laminate 301 can include various including, for example, conductive layers, dielectric layers, and/or solder masks. The number of layers, layer thicknesses, and materials used to form the layers can be selected based on a wide variety of factors, and can vary with application and/or implementation. The laminate 301 can include vias for providing electrical connections to signal feeds and/or ground feeds of the patch antenna elements 311-326. For example, in certain implementations, vias can aid in providing electrical connections between signaling conditioning circuits of the IC 302 and corresponding patch antenna elements.

Figure 8A:
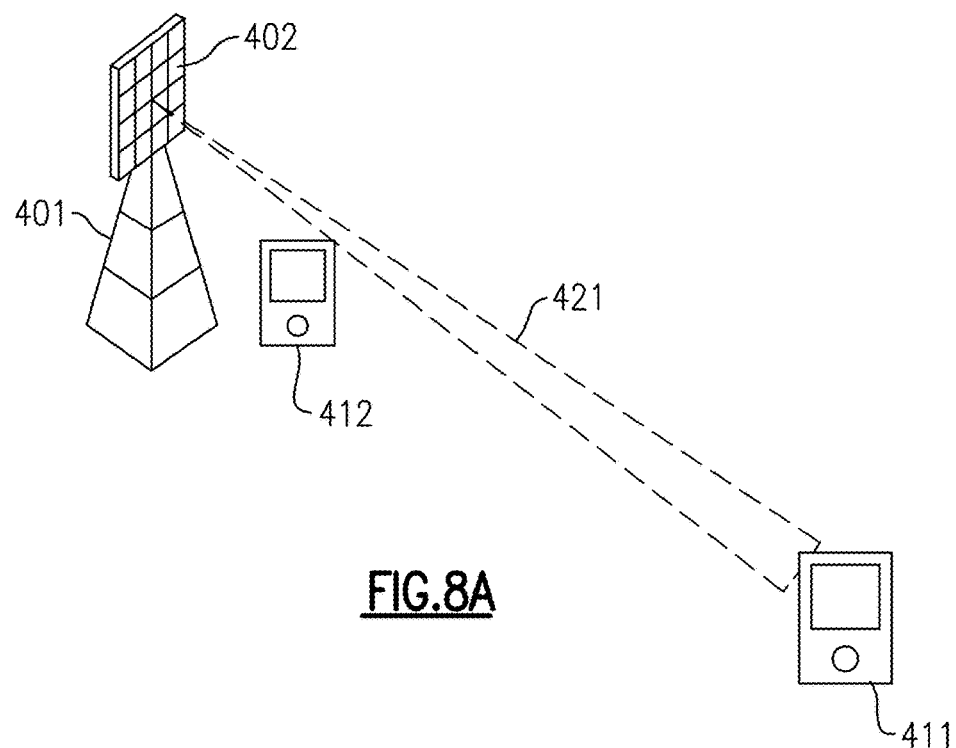
FIG. 8A is a schematic diagram of one example of a wireless network.

FIG. 8A is a schematic diagram of one example of a wireless network. The wireless network includes a network access point 401 (for instance, a base station or mounted network access device) that includes a dynamically managed antenna array 402. The wireless network further includes a first mobile communications device 411 and a second mobile communications device 412. In certain implementations, the first mobile communication device 411 and/or the second mobile communication device 412 include a dynamically managed antenna array, which can be the same or different size than the dynamically managed antenna array 402.

In FIG. 8A, the network access point 401 is in communication with the first mobile communications device 411 via a first beam 421, which is relatively focused for long range communication and/or high communication rates.

Figure 8B:
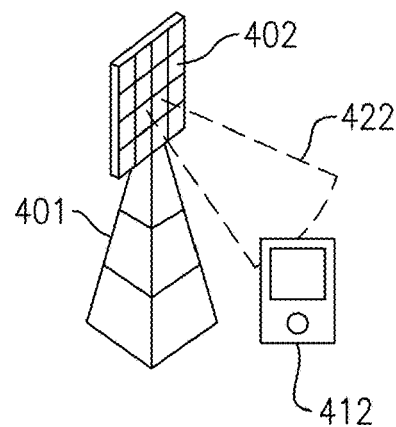
FIG. 8B is schematic diagram of another example of a wireless network.
Figure 8B:
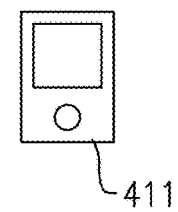

FIG. 8B is schematic diagram of another example of a wireless network.

The wireless network of FIG. 8B is similar to the wireless network of FIG. 8A, except that the network access point 401 has deactivated antenna elements to provide a second beam 422 that is defocused.

Although a focused beam may have the best range to establish radio frequency communications, such a focused beam may also exhibit the least ability to establish a communication channel with another device that is not centered on the beam path. Thus, the focused beam 421 of FIG. 8A may suitable for long range line-of-sight communications, while the second broad beam 422 may be suitable for short range communications with off-beam devices.

Although two examples of beam focuses are shown, the degree of beam focus by an antenna array can include additional settings or amounts of focus. For example, dynamically antenna element control can be used to control a beam in a wide variety of ways.

Figure 9A:
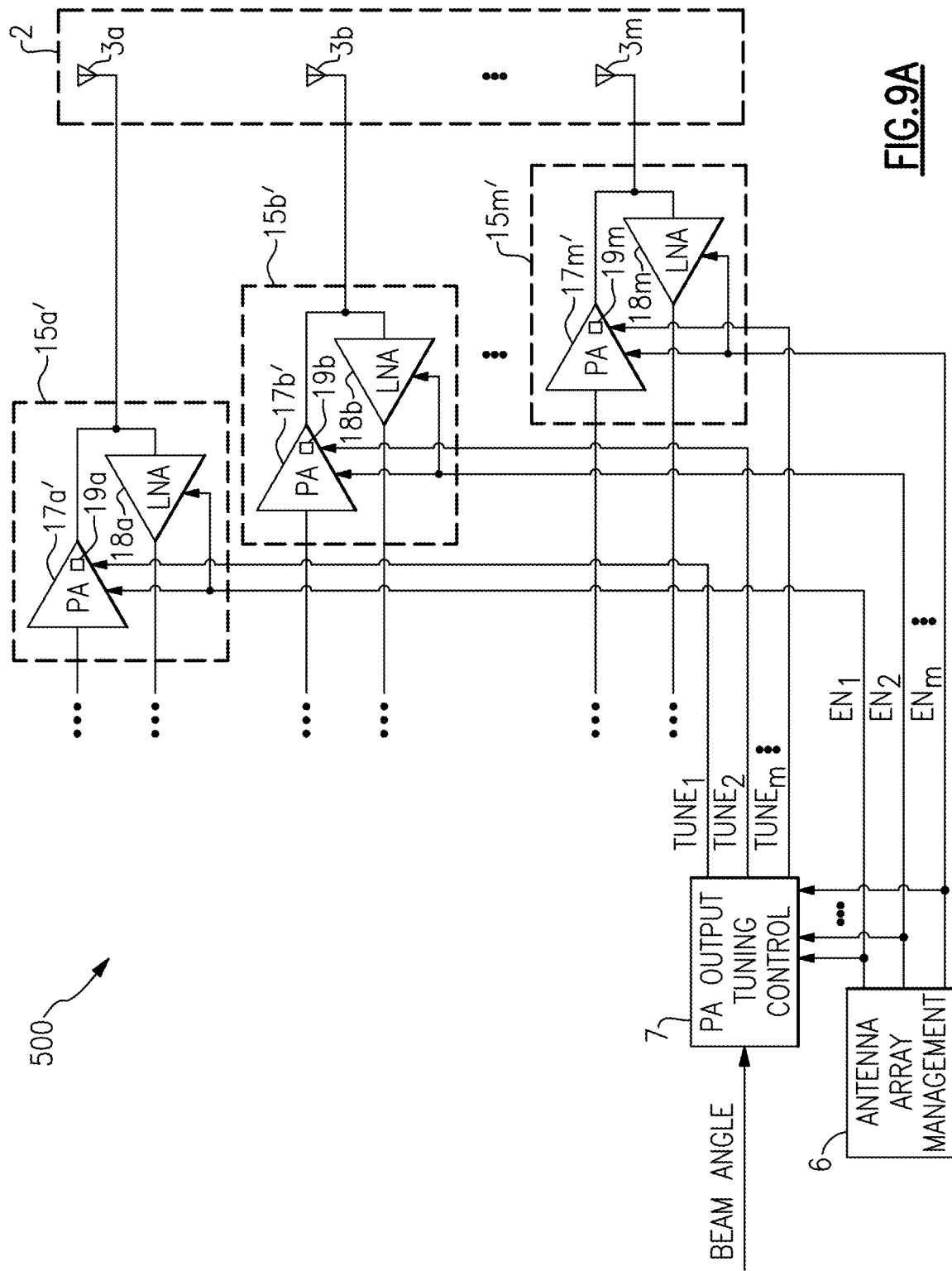
FIG. 9A is a schematic diagram of an RF system with dynamic antenna array management and power amplifier output tuning compensation according to one embodiment.

FIG. 9A is a schematic diagram of an RF system 500 with dynamic antenna array management and power amplifier output tuning compensation according to one embodiment. The RF system 500 includes an antenna array 2, signal conditioning circuits 15a', 15b' . . . 15m', an antenna array management circuit 6, and a power amplifier output tuning control circuit 7.

Although an embodiment with three antenna elements and corresponding signal conditioning circuits is shown, an RF system can more or fewer antenna elements and/or signal conditioning circuits as indicated by the ellipses.

In the embodiment shown in FIG. 9A, each of the signal conditioning circuits includes a power amplifier and an LNA. For example, the signal conditioning circuit 15a' includes a power amplifier 17a' and an LNA 18a, the signal conditioning circuit 15b' includes a power amplifier 17b' and an LNA 18b, and the signal conditioning circuit 15m' includes a power amplifier 17m' and an LNA 18m.

Although an example of signaling conditioning circuits with power amplifiers and LNAs is shown, other implementations of signaling conditioning circuits are possible. For example, a signaling conditioning circuit can include additional circuitry, including, for example, switches, phase shifters, and/or other components.

As shown in FIG. 9A, the antenna array management circuit 6 generates enable signals $EN_1$, $EN_2$ . . . $EN_m$ for individually controlling activation of the signal conditioning circuits 15a', 15b' . . . 15m', respectively.

Accordingly, the antenna array management circuit 6 dynamically manages the antenna array 2 by selectively enabling the signaling conditioning circuits 15a', 15b' . . . 15m'. By controlling the number and pattern of active antenna elements, the shape of the beam is controlled. Thus, the antenna array management circuit 6 controls a trade-off between power consumption, off-beam capture, and RF communication range/rate.

As shown in FIG. 9A, the RF system 500 further includes the power amplifier output tuning control circuit 7, which generates tuning control signals $TUNE_1$, $TUNE_2$ . . . $TUNE_m$ based on the enable signals $EN_1$, $EN_2$ . . . $EN_m$ and/or a beam angle signal indicating the beam angle.

When a particular pattern of active elements of the antenna array 2 is selected and/or a beam is steered at a particular angle, impedance matching at an output of one or more of the power amplifiers 17a', 17b' . . . 17m' can be impacted.

In the illustrated embodiment, each of the power amplifiers includes a tunable output impedance circuit. For example, the power amplifier 17a' includes a tunable output impedance circuit 19a, the power amplifier 17b' includes a tunable output impedance circuit 19b, and the power amplifier 17m' includes a tunable output impedance circuit 19m. The tuning control signals $TUNE_1$, $TUNE_2$ . . . $TUNE_m$ are operable to tune the tunable output impedance circuits 19a, 19b . . . 19m, respectively.

By compensating an output impedance of the power amplifiers 17a', 17b' . . . 17m' based on beam angle and/or a pattern of activated antenna elements, enhanced transmit performance can be achieved.

The antenna array management circuit 6 and/or the power amplifier output tuning control circuit 7 can be implemented in a wide variety of ways. In one example, the antenna array management circuit 6 and the power amplifier output tuning control circuit 7 are included in a transceiver. In another example, the antenna array management circuit 6 and the power amplifier output tuning control circuit 7 are included in a baseband processor.

Figure 9B:
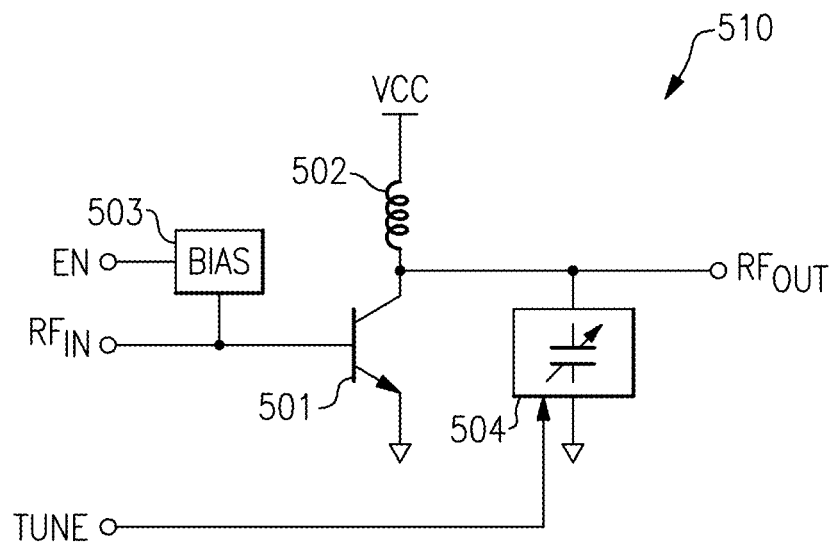
FIG. 9B is a schematic diagram of one example of a tunable power amplifier.

FIG. 9B is a schematic diagram of one example of a tunable power amplifier 510. The tunable power amplifier 510 illustrates one example of a power amplifier that can be included in a signal condition circuit, such as the signal conditions circuits 15a', 15b' . . . 15m' of FIG. 9A. Although FIG. 9B illustrate one example of a tunable power amplifier suitable for use in a signal condition circuit, a signal conditioning circuit can be implemented with other implementations of power amplifiers.

The tunable power amplifier 510 includes a bipolar transistor 501, a choke inductor 502, a bias circuit 503, and a tunable output impedance circuit 504.

The bipolar transistor 501 includes an emitter electrically connected to a reference voltage (for instance ground), a base that receives an RF input signal $RF_{IN}$ and a bias signal, and an emitter than generates an amplified RF output signal $RF_{OUT}$. Although a bipolar transistor implementation is shown, a power amplifier can be implemented in other ways, including, for example, using field-effect transistors.

As shown in FIG. 9B, the bias circuit 503 generates a bias signal for a base of the bipolar transistor 501. In the illustrated embodiment, the bias circuit 503 biases the bipolar transistor 501 by controlling a base current and/or a base-emitter voltage of the bipolar transistor 501. The bias circuit 503 receives an enable signal EN, in this example, which can be used by the bias circuit 503 to bias the bipolar transistor 501 on or off to selectively activate the power amplifier 510. The enable signal EN is controlled by an antenna array management circuit.

The choke inductor 502 operates to provide the power amplifier supply voltage $V_{CC}$ to the bipolar transistor 501 to thereby supply the power amplifier 510 with a power supply. For example, the choke inductor 502 can be used to provide low impedance to low frequency signal components, while choking or blocking high frequency signal components associated with the RF output signal $RF_{OUT}$. The choke inductor 502 can also contribute in part to provide output impedance matching, harmonic termination, and/or controlling load line impedance. In certain implementations, the power amplifier supply voltage $V_{CC}$ is generated by a power management circuit (for example, the power management circuit 805 of FIG. 11), which can include, for example, a DC-to-DC converter and/or other suitable power management circuitry.

The tunable output impedance circuit 504 controls an electrical termination of the power amplifier 510 and/or controls a load line impedance at the fundamental frequency of the RF input signal $RF_{IN}$. In certain implementations, the tunable output impedance circuit 504 can provide an impedance transformation and/or provide harmonic termination to the power amplifier 510.

As shown in FIG. 9B, the tunable output impedance circuit 504 is tunable by a tuning signal TUNE, which is generated by a power amplifier output tuning control circuit (for example, the power amplifier output tuning control circuit 7 of FIG. 9A).

In certain embodiments, the tunable output impedance circuit 504 includes a controllable capacitance component, such as a variable and/or programmable capacitor. For example, the tunable output impedance circuit 504 can include a bank of capacitors that are individually selectable by switches and that operate in parallel with one another when selected. Although an example with a tunable capacitance has been described, other implementations are possible, including, for example, tunable output impedance circuits that operate without varying capacitance.

The tuning signal TUNE can be a digital tuning signal and/or an analog tuning signal. Thus, the tunable output impedance circuit 504 can include analog and/or digital tuning or programmability.

Figure 9C:
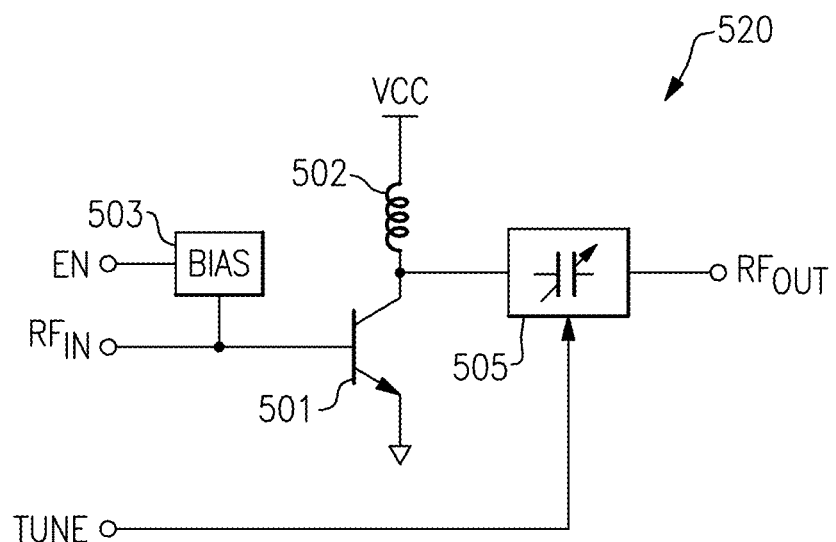
FIG. 9C is a schematic diagram of another example of a tunable power amplifier.

FIG. 9C is a schematic diagram of another example of a tunable power amplifier 520. The tunable power amplifier 520 illustrates another example of a power amplifier that can be included in a signal condition circuit, such as the signal conditions circuits 15a', 15b' . . . 15m' of FIG. 9A. Although FIG. 9C illustrates an example of a tunable power amplifier suitable for use in a signal condition circuit, a signal conditioning circuit can be implemented with other implementations of power amplifiers.

The tunable power amplifier 520 includes a bipolar transistor 501, a choke inductor 502, a bias circuit 503, and a tunable output impedance circuit 505. The tunable power amplifier 520 of FIG. 9C is similar to the tunable power amplifier 510 of FIG. 9A, except that the tunable power amplifier 520 includes a series tunable impedance circuit rather than a shunt tunable impedance circuit. Tunable impedance can be provided in a wide variety of ways, including, for example, using series and/or shunt tuning circuits.

Figure 10:
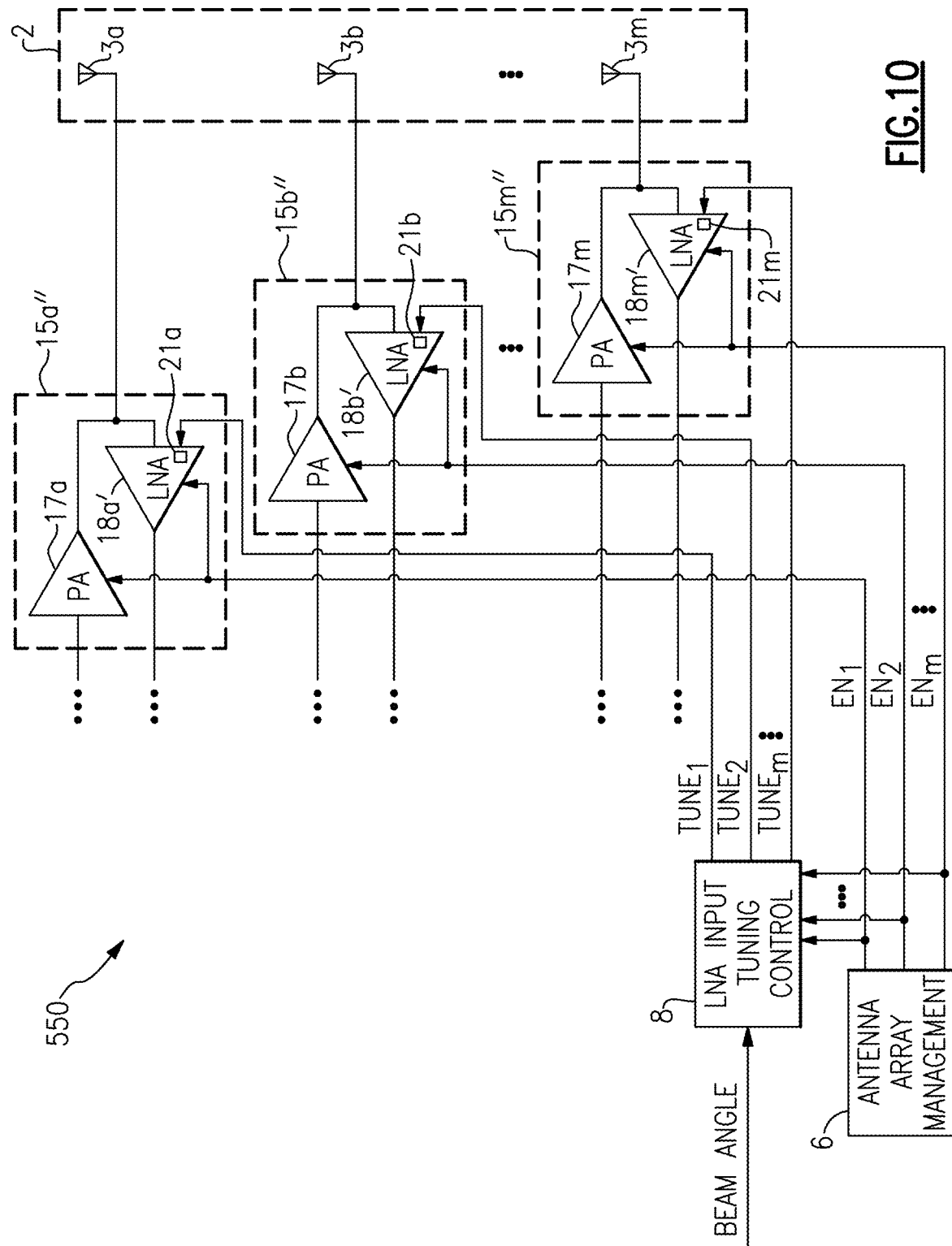
FIG. 10 is a schematic diagram of an RF system with dynamic antenna array management and low noise amplifier input tuning compensation according to one embodiment.

FIG. 10 is a schematic diagram of an RF system 550 with dynamic antenna array management and low noise amplifier input tuning compensation according to one embodiment. The RF system 550 includes an antenna array 2, signal conditioning circuits 15a", 15b" . . . 15m", an antenna array management circuit 6, and an LNA input tuning control circuit 8.

Although an embodiment with three antenna elements and corresponding signal conditioning circuits is shown, an RF system can more or fewer antenna elements and/or signal conditioning circuits as indicated by the ellipses.

In the embodiment shown in FIG. 10, each of the signal conditioning circuits includes a power amplifier and an LNA. For example, the signal conditioning circuit 15a" includes a power amplifier 17a and an LNA 18a', the signal conditioning circuit 15b" includes a power amplifier 17b and an LNA 18b', and the signal conditioning circuit 15m" includes a power amplifier 17m and an LNA 18m'.

Although an example of signaling conditioning circuits with power amplifiers and LNAs is shown, other implementations of signaling conditioning circuits are possible. For example, a signaling conditioning circuit can include additional circuitry, including, for example, switches, phase shifters, and/or other components.

As shown in FIG. 10, the antenna array management circuit 6 generates enable signals $EN_1$, $EN_2$ . . . $EN_m$ for individually controlling activation of the signal conditioning circuits 15a", 15b" . . . 15m", respectively.

Accordingly, the antenna array management circuit 6 dynamically manages the antenna array 2 by selectively enabling the signaling conditioning circuits 15a", 15b" . . . 15m". By controlling the number and pattern of active antenna elements, the shape of the beam is controlled. Thus, the antenna array management circuit 6 controls a trade-off between power consumption, off-beam capture, and RF communication range/rate.

As shown in FIG. 10, the RF system 550 further includes the LNA input tuning control circuit 8, which generates tuning control signals $TUNE_1$, $TUNE_2$ . . . $TUNE_m$ based on the enable signals $EN_1$, $EN_2$ . . . $EN_m$ and/or a beam angle signal indicating the beam angle.

When a particular pattern of active elements of the antenna array 2 is selected and/or a beam is steered at a particular angle, impedance matching at an input of one or more of the LNAs 18a', 18b' . . . 18m' can be impacted.

In the illustrated embodiment, each of the LNAs includes a tunable input impedance circuit. For example, the LNA 18a' includes a tunable input impedance circuit 21a, the LNA 18b' includes a tunable input impedance circuit 21b, and the LNA 18m' includes a tunable input impedance circuit 21m. The tuning control signals $TUNE_1$, $TUNE_2$ . . . $TUNE_m$ are operable to tune the tunable input impedance circuits 21a, 21b . . . 21m, respectively. The tunable input impedance circuits can be implemented in a wide variety of ways, including, for example, using series and/or shunt tuning circuits that operate with tunable capacitance and/or other tuning.

By compensating an input impedance of the LNAs 18a', 18b' . . . 18m' based on beam angle and/or a pattern of activated antenna elements, enhanced transmit performance can be achieved.

The antenna array management circuit 6 and/or the LNA input tuning control circuit 8 can be implemented in a wide variety of ways. In one example, the antenna array management circuit 6 and the LNA input tuning control circuit 8 are included in a transceiver. In another example, the antenna array management circuit 6 and the LNA input tuning control circuit 8 are included in a baseband processor.

In certain embodiments, herein an RF system can include both a power amplifier output tuning control circuit and an LNA input tuning control circuit. For example, an RF system can include both the PA output tuning control circuit 7 of FIG. 9A and the LNA input tuning control circuit 8 of FIG. 10, with the signal conditioning circuits implemented with associated tunable impedance circuits.

Figure 11:
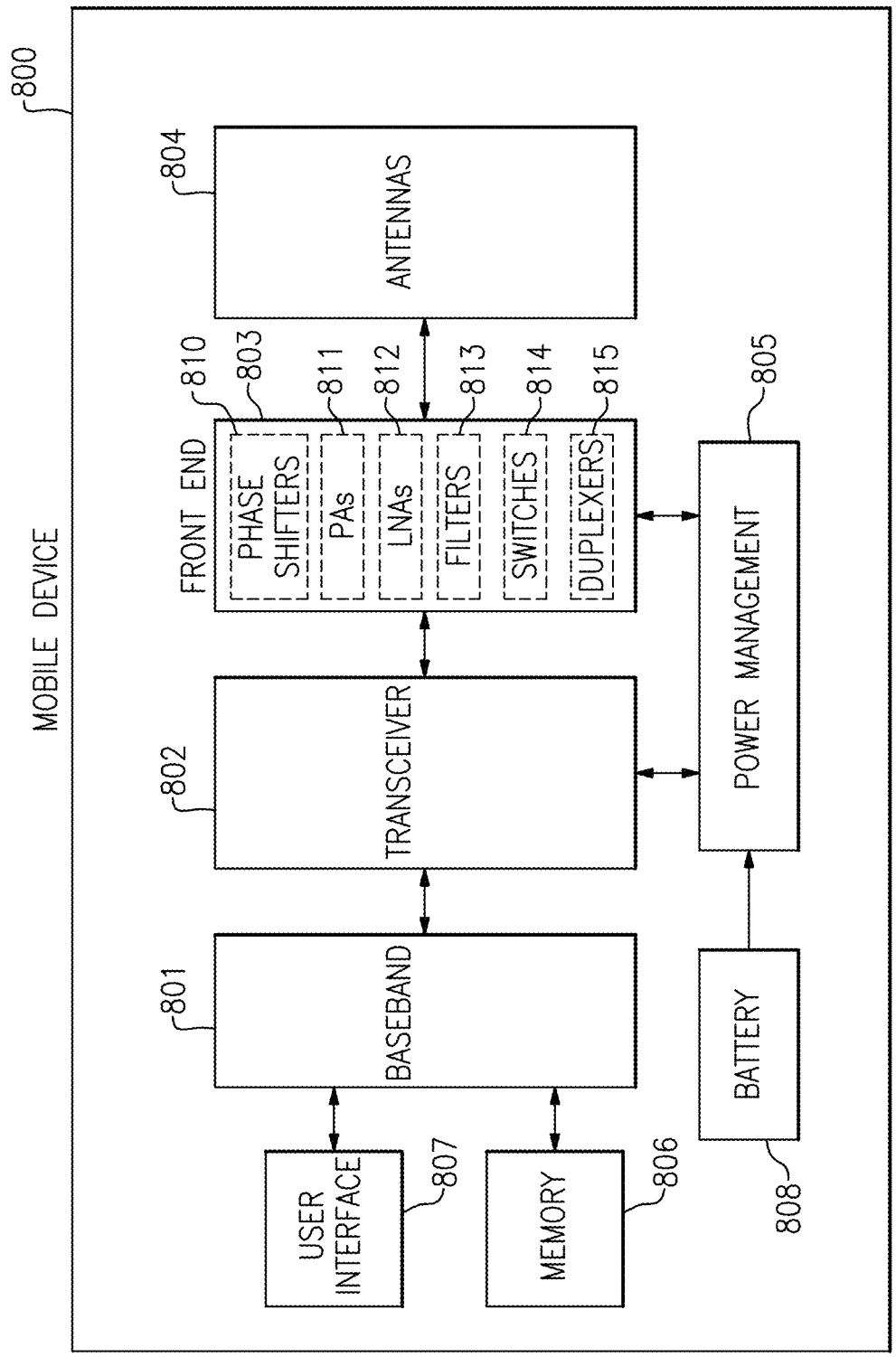
FIG. 11 is a schematic diagram of one embodiment of a mobile device 800.

FIG. 11 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 11 as the transceiver 802. In one example, separate components (for instance, separate circuits or dies) can be provided for handling certain types of RF signals. In certain implementations, the transceiver 802 includes at least one an antenna array management circuit, a power amplifier output tuning control circuit, or an LNA input tuning control circuit.

The front end system 803 aids is conditioning signals transmitted to and/or received from the antennas 804. In the illustrated embodiment, the front end system 803 includes phase shifters 810, power amplifiers (PAs) 811, low noise amplifiers (LNAs) 812, filters 813, switches 814, and duplexers 815. Thus, the front end system 803 includes the signal conditioning circuits, in this embodiment.

Although one embodiment of a front end system is shown in FIG. 11, other implementations are possible. For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include phase shifters having variable phase controlled by the transceiver 802. Additionally, the phase shifters are controlled to provide beam formation and directivity for transmission and/or reception of signals using the antennas 804. For example, in the context of signal transmission, the phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 11, the baseband system 801 is coupled to the memory 806 of facilitate operation of the mobile device 800. In certain implementations, the baseband system 801 includes at least one an antenna array management circuit, a power amplifier output tuning control circuit, or an LNA input tuning control circuit.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 11, the power management system 805 receives a battery voltage from the battery 808. The battery 808 can be any suitable battery for use in the mobile device 800, including, for example, a lithium-ion battery.

Figure 12A:
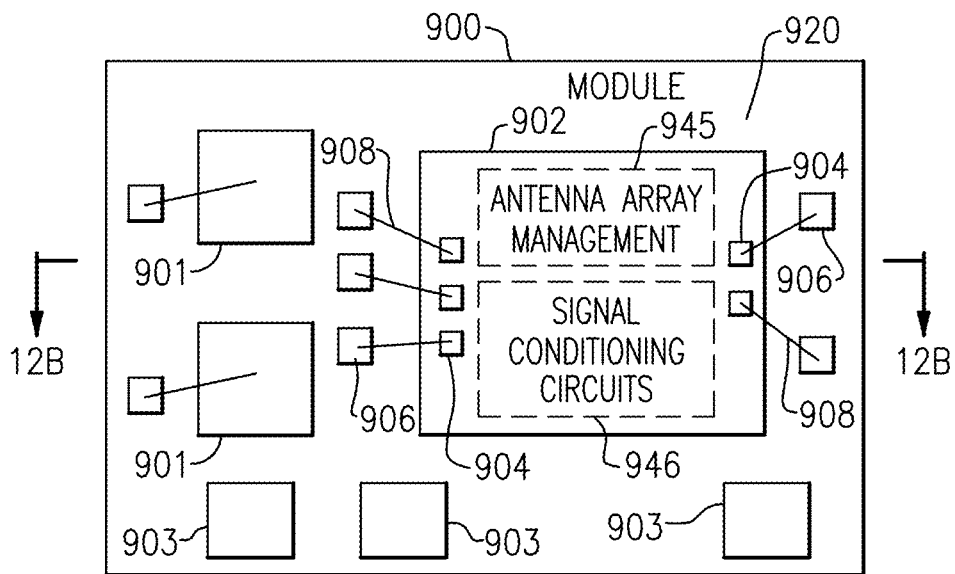
FIG. 12A is a schematic diagram of one embodiment of a packaged module.
Figure 12B:
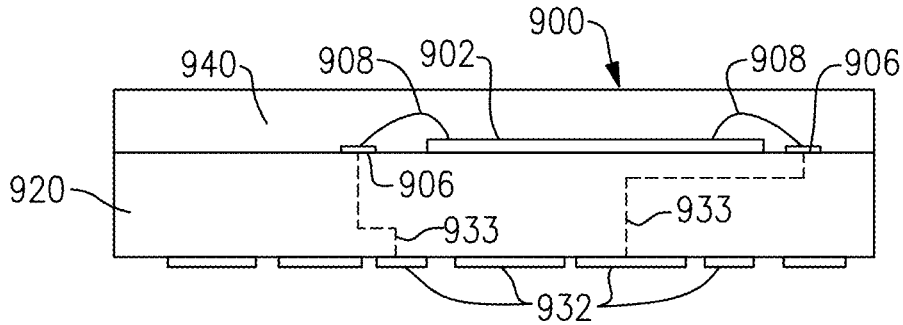
FIG. 12B is a schematic diagram of a cross-section of the packaged module of FIG. 12A taken along the lines 12B-12B.

FIG. 12A is a schematic diagram of one embodiment of a packaged module 900. FIG. 12B is a schematic diagram of a cross-section of the packaged module 900 of FIG. 12A taken along the lines 12B-12B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes at least one of an antenna array management circuit 945 or signal conditioning circuits 946 implemented in accordance with one or more features disclosed herein. In certain implementations, the semiconductor die 902 further includes at least one of a power amplifier output tuning control circuit or an LNA input tuning control circuit.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 12B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 12B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 13:
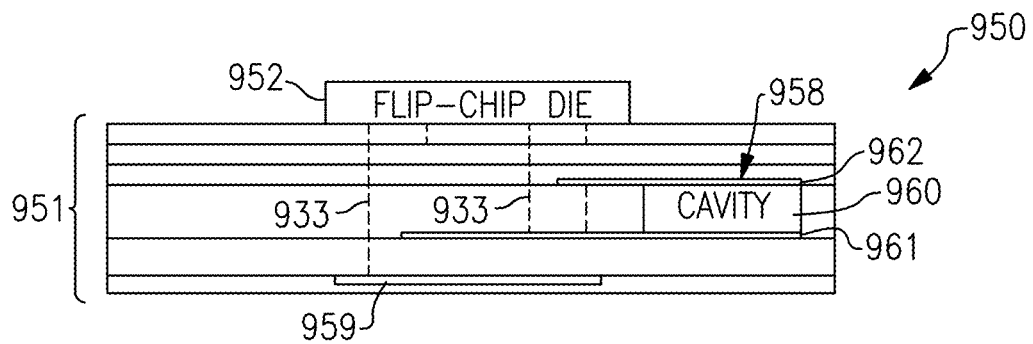
FIG. 13 is a schematic diagram of a cross-section of another embodiment of a packaged module.

FIG. 13 is a schematic diagram of a cross-section of another embodiment of a packaged module 950. The packaged module 950 includes a laminated package substrate 951 and a flip-chip die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a packaged module includes one or more integrated antennas. For example, the packaged module 950 of FIG. 13 includes the cavity-based antenna 958 and the planar antenna 959. Although one example of a packaged module with integrated antennas is shown, the teachings herein are applicable to modules implemented in a wide variety of ways.

In certain embodiments, a packaged module includes a first array of antenna elements on a major surface of the module, and a second array of antenna elements on an edge of the module. For example, the first array of antenna elements can correspond to an array of patch antennas, and the second array of antenna elements can correspond to an array of cavity-based antennas. The first array and/or second array can be dynamically managed in accordance with the teachings herein.

Figure 14:
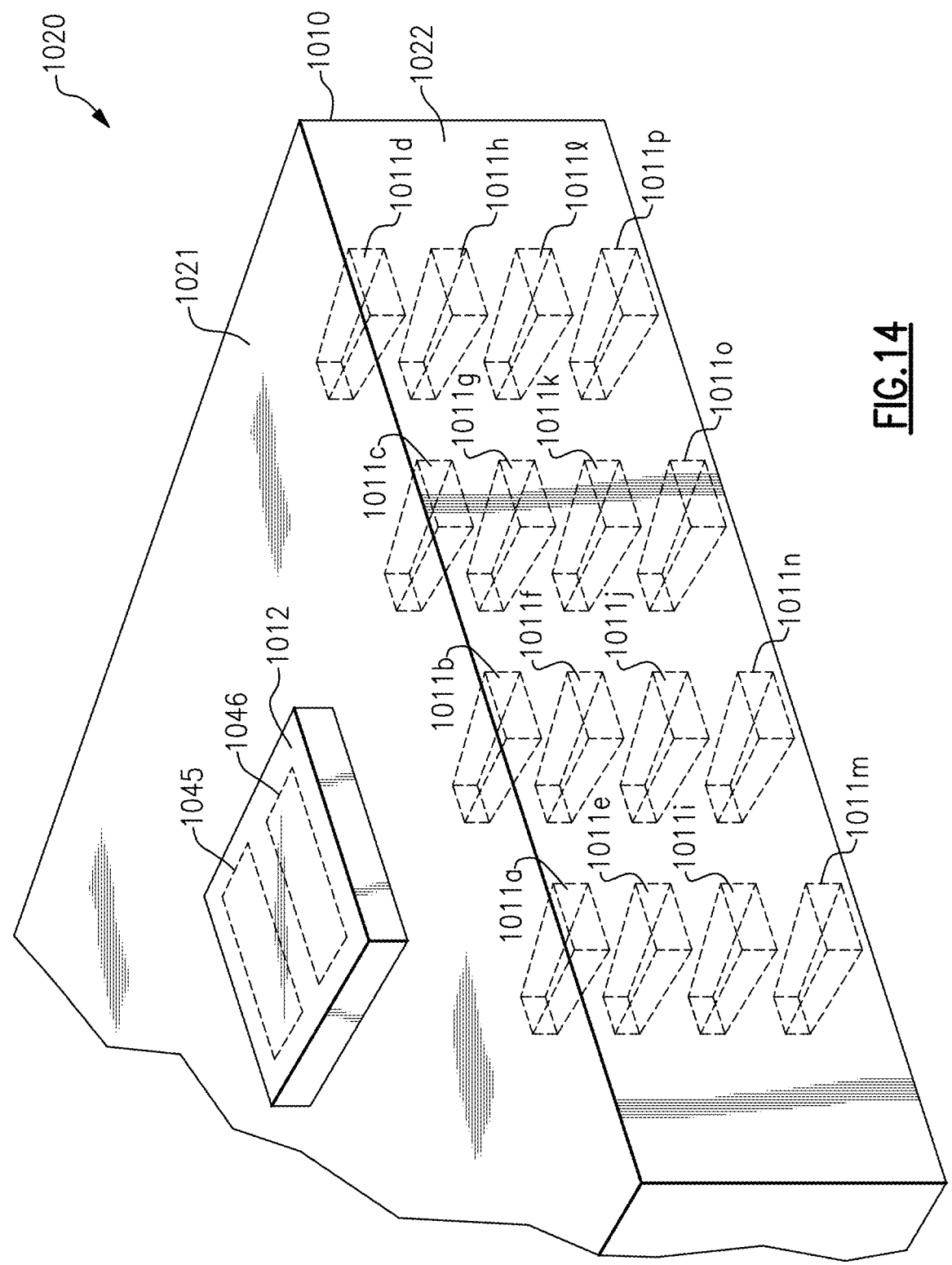
FIG. 14 is a schematic diagram of another embodiment of a module with dynamic antenna array management.

FIG. 14 is a schematic diagram of another embodiment of a module 1020 with dynamic antenna array management. The module 1020 includes a laminated substrate 1010 and a semiconductor die 1012.

As shown in FIG. 14, the semiconductor die 1012 is attached to a major surface 1021 of the laminated substrate 1010. The semiconductor die 1012 includes at least one of an antenna array management circuit 1045 or signal conditioning circuits 1046 implemented in accordance with one or more features disclosed herein. In certain implementations, the semiconductor die 1012 further includes at least one of a power amplifier output tuning control circuit or an LNA input tuning control circuit.

In the illustrated the embodiment, cavity-based antennas 1011a-1011p have been formed on an edge 1022 of the laminated substrate 1010. In this example, sixteen cavity-based antennas have been provided in a four-by-four (4×4) array. However, more or fewer antennas can be included and/or antennas can be arrayed in other patterns.

In another embodiment, the laminated substrate 1010 further include another antenna array (for example, a patch antenna array) formed on a second major surface of the laminated substrate 1010 opposite the first major surface 1021. Implementing the module 1020 aids in increasing a range of angles over which the module 1020 can communicate.

The module 1020 illustrates another embodiment of a module including an array of antennas that are dynamically managed to control a trade-off between power consumption, off-beam capture, and communication range/rate. Although an example with cavity-based antennas is shown, the teachings herein are applicable to implementations using other types of antennas.

Applications

Some of the embodiments described above have provided examples of dynamic antenna array management in connection with wireless communications devices. However, the principles and advantages of the embodiments can be used for any other systems or apparatus that benefit from any of the circuits and systems described herein.

For example, dynamically managed antenna arrays can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A module for a communications device, the module comprising:
    a substrate;
    a first antenna array formed on the substrate, the first antenna array including a first plurality of antenna elements;
    a semiconductor die attached to the substrate and including a plurality of signal conditioning circuits, each signal conditioning circuit including at least one of a transmit conditioning circuit or a receive conditioning circuit, each conditioning circuit operatively associated with a corresponding one of the first plurality of antenna elements, and the semiconductor die further including an antenna array management circuit configured to individually control activation of the plurality of signal conditioning circuits to dynamically activate a corresponding pattern of activated antenna elements; and
    tuning control circuitry configured to dynamically tune an input impedance or an output impedance of the activated signal conditioning circuits.

2. The module of claim 1 further comprising a second antenna array formed on the substrate, the second antenna array comprising a second plurality of antenna elements, wherein the first antenna array is formed on a first surface of the substrate and the second antenna array is formed on a second surface of the substrate, and the antenna array management circuit is further configured to dynamically manage the second antenna array.

3. The module of claim 2 wherein the semiconductor die is attached to a major surface of the substrate, and the second antenna array includes a plurality of cavity-based antennas along an edge of the substrate.

4. The module of claim 2 wherein the first and second antenna arrays point in orthogonal directions.

5. The module of claim 1 wherein at least some of the plurality of signal conditioning circuits include a receive conditioning circuit including a receive amplifier, and the tuning control circuitry is configured to tune an input impedance of the receive amplifiers.

6. The module of claim 1 wherein at least some of the plurality of signal conditioning circuits include a transmit conditioning circuit including a transmit amplifier, and the tuning control circuitry is configured to tune an output impedance of the transmit amplifiers.

7. The module of claim 1 wherein each signal conditioning circuit further includes one or more radio frequency filters, attenuators, phase shifters, or switches.

8. A radio frequency system comprising:
    an antenna array including a plurality of antenna elements;
    a plurality of signal conditioning circuits, each signal conditioning circuit including one or more of a transmit conditioning circuit or a receive conditioning circuit operatively associated with a corresponding one of the plurality of antenna elements;
    an antenna array management circuit configured to individually control activation of the plurality of signal conditioning circuits to dynamically activate a corresponding pattern of activated antenna elements; and
    tuning control circuitry configured to dynamically tune an impedance of the activated signal conditioning circuits.

9. The radio frequency system of claim 8 wherein at least some of the plurality of signal conditioning circuits include a receive conditioning circuit including a low noise amplifier, and wherein the tuning control circuitry is configured to dynamically tune an input impedance of the low noise amplifier.

10. The radio frequency system of claim 8 wherein at least some of the plurality of signal conditioning circuits include a transmit conditioning circuit including a power amplifier, and wherein the tuning control circuitry is configured to dynamically tune an output impedance of the power amplifier.

11. The radio frequency system of claim 8 wherein the antenna array management circuit controls an activation state of the plurality of signal conditioning circuits based on one or more inputs indicative of a communications link of the antenna array.

12. The radio frequency system of claim 11 wherein the one or more inputs includes an achieved data rate of the communications link.

13. The radio frequency system of claim 11 wherein the one or more inputs includes an observed error rate of the communications link.

14. The radio frequency system of claim 11 wherein the one or more inputs includes a receive signal strength indicator.

15. The radio frequency system of claim 11 wherein the one or more inputs includes an indicator of geo-positioning.

16. The radio frequency system of claim 8 wherein each signal conditioning circuit further includes one or more radio frequency filters, attenuators, phase shifters, or switches.

17. A method of antenna array management, the method comprising:
- using a plurality of antenna elements of an antenna array for wirelessly communicating a plurality of radio frequency signals, the antenna array including a plurality of antenna elements each wirelessly communicating a corresponding one of the plurality of radio frequency signals;
- conditioning the plurality of radio frequency signals of the plurality of antenna elements using a plurality of signal conditioning circuits each including one or more of a transmit conditioning circuit or a receive conditioning circuit and associated with a respective one of the plurality of radio frequency signals;
- individually controlling activation of each of the plurality of signal conditioning circuits using a corresponding one of a plurality of enable signals to control a pattern of activated antenna elements of the antenna array; and
- dynamically tuning an impedance of the activated signal conditioning circuits using tuning control circuitry.

18. The method of claim 17 wherein individually controlling activation of each of the plurality of signal conditioning circuits includes dynamically adjusting a transmit or receive beam.

19. The method of claim 17 wherein at least some of the plurality of signal conditioning circuits include a receive conditioning circuit including a low noise amplifier, and the tuning control circuitry is configured to dynamically tune an input impedance of the low noise amplifier.

20. The method of claim 17 wherein at least some of the plurality of signal conditioning circuits include a transmit conditioning circuit including a power amplifier, and the tuning control circuitry is configured to dynamically tune an output impedance of the power amplifier.

* * * * *